US007729954B2

(12) United States Patent
Frederick et al.

(10) Patent No.: US 7,729,954 B2
(45) Date of Patent: Jun. 1, 2010

(54) PROVIDING PAID ACCESS TO REMOTE WEB SERVICE IN AN ELECTRONIC MARKETPLACE

(75) Inventors: Robert Frederick, Seattle, WA (US); Ashish Agrawal, Seattle, WA (US); Jeffrey Barr, Sammamish, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 78 days.

(21) Appl. No.: 12/207,367

(22) Filed: Sep. 9, 2008

(65) Prior Publication Data

US 2009/0099940 A1 Apr. 16, 2009

Related U.S. Application Data

(63) Continuation of application No. 10/766,697, filed on Jan. 27, 2004, now Pat. No. 7,433,835.

(51) Int. Cl.
 *G06Q 30/00* (2006.01)
(52) U.S. Cl. .......................................... 705/26
(58) Field of Classification Search ............... 705/26, 705/27
See application file for complete search history.

(56) References Cited

U.S. PATENT DOCUMENTS

| | | | | |
|---|---|---|---|---|
| 5,815,665 | A * | 9/1998 | Teper et al. ............... | 709/229 |
| 5,826,244 | A | 10/1998 | Huberman .................. | 705/37 |
| 6,078,906 | A | 6/2000 | Huberman .................. | 705/37 |
| 2002/0120461 | A1 | 8/2002 | Kirkconnell-Ewing et al. . | 705/1 |
| 2002/0120519 | A1 | 8/2002 | Martin et al. ............... | 705/21 |
| 2002/0161676 | A1 | 10/2002 | Vadlamani ................. | 705/30 |
| 2003/0188017 | A1 * | 10/2003 | Nomura ..................... | 709/241 |
| 2003/0195813 | A1 | 10/2003 | Pallister et al. ............. | 705/26 |
| 2004/0122926 | A1 | 6/2004 | Moore et al. ............... | 709/223 |
| 2004/0243583 | A1 | 12/2004 | Olsen ........................ | 707/10 |
| 2005/0114437 | A1 | 5/2005 | Creamer et al. ............ | 709/203 |

(Continued)

FOREIGN PATENT DOCUMENTS

JP 2001350943 A 12/2001

OTHER PUBLICATIONS

Actional™, Web Services Management Platform, retrieved Nov. 7, 2003, from http://www.actional.com/products/web_services/index.asp.

(Continued)

*Primary Examiner*—Amee A Shah
(74) *Attorney, Agent, or Firm*—Seed IP Law Group

(57) ABSTRACT

A method, system, and computer-readable medium is described for facilitating interactions between computing systems, such as by providing an electronic Web service ("WS") marketplace via which third-party WS providers make their WSes available to third-party WS consumers who locate and purchase access to those WSes via the electronic marketplace. Some or all available WSes may have associated use prices and or non-price use conditions, and if so access to those WSes may be provided only if a consumer requesting access provides appropriate payment and otherwise satisfies the specified use conditions. In some situations, WS consumers may also purchase subscriptions to provide later access to registered WSes. This abstract is provided to comply with rules requiring it, and is submitted with the intention that it will not be used to interpret or limit the scope or meaning of the claims.

50 Claims, 10 Drawing Sheets

U.S. PATENT DOCUMENTS

2005/0125389 A1    6/2005    Hazzard et al. ................ 707/3

OTHER PUBLICATIONS

Actional™, The Web Services Management Platform: Managing the Impact of Change in an Enterprise Web Services Network—Mar. 2003, retrieved Nov. 7, 2003, from http://www.actional.com/downloads/products/managing.enterpriseweb.services.network.pdf.
Allidex, Frequently Asked Questions, retrieved Nov. 4, 2003, from http://www.allidex.com/faq.html.
Amazon.com, Inc., Web Services FAQ's, retrieved Nov. 4, 2003, from http://www. amazon.com/gp/browse.html/ref=sc_bb_1_0/104-7530911-9659969?no=3435361&me=A3.6.L.
Amazon.com, Inc., Sellers and Vendors: Sell More Using Web Services, retrieved Nov. 4, 2003, from http://www.amazon.com/gp/browse.html/ref=sc_bb___1/104-7530911-9659969?no=3435361&me=A3.6.L.
Amazon.com, Inc., Associates: Enhance Your Site Using Web Services, retrieved Nov. 4, 2003, from http://www.amazon.com/gp/browse.html/ref=sc_bb_1_1/104-7530911-9659969?no=3435361&me=A3.6.L.
Amazon.com, Inc. Developers: Build Solutions for Amazon Partners, retrieved Nov. 4, 2003, from http://www.amazon.com/gp/browse.html/ref=sc_bb_1_1/104-7530911-9659969?no=3435361&me=A3.6.L.
Amazon.com, Inc., Web Services, retrieved Nov. 4, 2003, from http://www.amazon.com/gp/browse.html/104-7530911-9659969?node=3435361.
"The Bowstreet™ Business Web Exchange Fuels B2B Revolution With First-of-its-Kind 'Web Services' Marketplace," Mar. 16, 2000, Bowstreet.com Inc., retrieved Sep. 9, 2005, from http://web.archive.org/web/20010219033902/http://www.bowstreet.com/news/press_release..., 4 pages.
Business Wire, "Desktop.com Introduces Devtop, the First Integrated Platform for Building, Deploying, and Distributing Web-Based Applications," Jun. 26, 2000, retrieved Sep. 8, 2005 from http://www.findarticles.com/p/articles/mi_m0EIN/is_2000_June_26/ai_62915951/print, 2 pages.
CPA2Biz, Inc., "New Rivio Business Services Suite," Apr. 18, 2001, retrieved Sep. 8, 2005, from https://www.cpa2biz.com/Corp/Press+Releases/PR_WebTools_18APR01.htm, 3 pages.
CPA2Biz, Inc., "Verizon Unveils Rivio Web Services Suite for Small Business Customers," May 29, 2001, retrieved Sep. 22, 2005 from https://www.cpa2biz.com/Corp/Press+Releases/PR_VERIZON_29MAY01.htm, 3 pages.
E2OPEN™, E2open Products, retrieved Nov. 7, 2003, from http://www.e2open.com/products/.
E2OPEN™, The E2open Integration Platform, retrieved Nov. 7, 2003, from http://www.e2open.com/downloads/e2open_integration_platform_datasheet.pdf.
ebizQ, Product Quicktake, retrieved Nov. 7, 2003, from http://www.ebizq.net/reports/1884.html?download=1.
Grand Central™ Communications website, retrieved Nov. 6, 2003, from http://www.grandcentral.com/products/.
Grand Central™ Communications, Frequently Asked Questions, retrieved Nov. 6, 2003, from http://www.grandcentral.com/products/faqs/index_html.
Jamcracker, Inc., "Jamcracker announces Pivot Path: Fully integrated software suite for Identity Management," Nov. 11, 2003, retrieved Sep. 12, 2005, from http://web.archive.org/web/20040607054618/http://jamcracker.com/pivot_path_release.pdf, 2 pages.
"Metering and Accounting for Web Services," IBM®, Jul. 2001, http://www-106.ibm.com/developerworks/library/ws-maws/, 6 pages.
"NTT Com to Launch Asia's First UDDI Registry on Oct. 9," Oct. 8, 2002, NTT Communications, retrieved Sep. 9, 2005, from http://www.ntt.com/release_e/news02/0010/1008.html, 3 pages.
OASIS, UDDI.org, retrieved Sep. 8, 2005, from http://www.uddi.org/find.html, 2 pages.
Sabre Travel Network, Sabre Travel Network Launches Web Services Capabilities for Agents, Jul. 28, 2003, retrieved Sep. 13, 2005 from http://phx.corporate-ir.net/phoenix.zhtml?c=73098&p=IROL-NewsText&t=Regular&id=435603&logo=logo03, 2 pages.
SalCentral, WSDL, SOAP, Web Services Search Engine and Web Service Tracking, Oct. 11, 2003, retrieved Oct. 6, 2005, from http://web.archive.org/web/20031011101544/www.salcentral.com/salnet/webserviceswsdlne.asp, 1 page.
SalCentral, WSDL, SOAP and Web Services and Quality Assurance and promotion, Oct. 4, 2003, retrieved Sep. 7, 2005, from http://web.archive.org/web/20031004143940/www.salcentral.com/salnet/webservicewhat.asp, 2 pages.
SalCentral, The Napster of Web Services, Oct. 4, 2003, retrieved Sep. 7, 2005, from http://web.archive.org/web/20031004143406/www.salcentral.com/salnet/webservicesnapster.asp, 2 pages.
SalCentral, Subscription of Web Services, Oct. 5, 2003, retrieved Sep. 7, 2005, from http://web.archive.org/web/20031005075820/www.salcentral.com/salnet/wpsubws.htm, 5 pages.
SoftwareMarkets.com, Frequently Asked Questions from Developers, Sep. 18, 2000, retrieved Sep. 8, 2005, from http://web.archive.org/web/20000918003355/www.softwaremarkets.com/info/faqdevs.html, 3 pages.
Sterling Commerce, Sterling Information Broker, retrieved Nov. 10, 2003, from http://www.sterlingcommerce.com/solutions/em/commerce/iibs.html.
Sterling Commerce, Sterling Information Broker, retrieved Nov. 10, 2003, from http://www.sterlingcommerce.com/PDF/Solutions/Sterling/SC0040.InfoBrokerOver.6-02.pdf.
StrikeIron, Inc., "StrikeIron Launches the Web Services Business Network," Jun. 23, 2004, retrieved Sep. 8, 2005 from http://www.strikeiron.com/news/si_launches.aspx, 3 pages.
StrikeIron, Inc., "StrikeIron Web Services Business Network Overview," retrieved Sep. 12, 2005 from http://www.strikeiron.com/doc/StrikeIronWebServicesBusinessNetworkOverview.pdf, 24 pages.
UNISYS, Web Service Marketplace, retrieved Nov. 4, 2003, from http://www.unisysfsp.com/default.aspx?catID+16.
"The Web Services Architect: Catalysts For Fee-Based Web Services," IBM®, Nov. 2001, http://www-106.ibm.com/developerworks/library/ws-arc6/, 7 pages.
"Web Service Use Case," ContentGuard Holdings, Inc., retrieved Aug. 9, 2005, from http://www.contentguard.com/reference/docs/SimpleWebServiceExampleContent.htm, 4 pages.
"Web Service Use Case: Travel Reservation—Use Case May 5, 2002," W3C®, May 2002, retrieved Aug. 9, 2005, from http://www.w3.org/2002/06/ws-example, 9 pages.
"Web Services Architecture Usage Scenarios—W3C Working Draft Jul. 30, 2002," W3C®, Jul. 2002, retrieved Aug. 2, 2005, from http://www.w3.org/TR/2002/WD-ws-arch-scenarios-20020730/, 78 pages.
"Web Services Marketplace," retrieved Sep. 9, 2005, from http://web.archive.org/web/20010404230735/www/epicentric.com/solutions/mkt.jsp, 4 pages.
Web Services Architect, Web Services Resources, retrieved Nov. 6, 2003, from http://webservicesarchitect.com/resources.asp.
Westglobal, Products—Overview, retrieved Nov. 7, 2003, from http://www.westglobal.com/products/mscape_overview.htm.
Westglobal, Products—Revenue Management Module, retrieved Nov. 7, 2003, from http://www.westglobal.com/products/mscape_revman.htm.
WestGlobal mScape™, Web Services Business Management System, retrieved Nov. 7, 2003, from http://www.westglobal.com/downloable_media/mscape_literature.zip.
W3C, "WS Choreography Model Overview," Mar. 24, 2004, retrieved Sep. 8, 2005, from http://www.w3.org/TR/2004/WD-ws-chor-model-20040324/, 35 pages.
XMETHODS website, retrieved Nov. 6, 2003, from http://www.xmethods.net/.
ZapThink, LLC, ZapThink Briefing Note—Oct. 8, 2002, retrieved Nov. 7, 2003, from http://www.grandcentral.com/assets/docs/GC.zapthink_report.pdf.
Albrecht, C., et al., "Marketplace and Technology Standards for B2B. Ecommerce: Progress and Challenges," MIS Quarterly Special Issue on Standard Making, International Conference on Information Systems, Dec. 2003, Seattle, WA, pp. 188-209, 22 pages.

Binstock, A., "Staking New Territory, Breaking New Ground," retrieved Sep. 9, 2005, from http://archive.devx.com/javaSR/articles/binstock/binstock.asp, 6 pages.

Box, Don et al., "Web Services Policy Framework (WS-Policy)," Jun. 2, 2003, retrieved Sep. 12, 2005, from ftp://www6.software.ibm.com/software/developer/library/ws-policy2003.pdf, 21 pages.

Brown, R., "Epicentric Unveils Web Services E-Hub," Mar. 21, 2001, Line56.com, retrieved Sep. 9, 2005, from http://www.line56.com/print/default.asp?ArticleID=2287, 2 pages.

Bunting, Doug et al., "Web Services Composite Application Framework (WS-CAF)," Jul. 28, 2003, retrieved Sep. 12, 2005, from http://www.oasis-open.org/committees/download.php/4343/WS-CAF%20Primer.pdf, 23 pages.

Burbeck, S., "The Tao of E-Business Services—The Evolution of Web Applications Into Service-Oriented Components With Web Services," Oct. 2000, IBM®, http://www-4.ibm.com/software/developer/library/ws-tao/index.html, 13 pages.

Clark, M., "Business Architecture For A Web Services Brokerage—Understanding The Business Context Of Web Services," Aug. 1, 2001, retrieved Aug. 2, 2005, from http://www.webservicesarchitect.com/content/artciles/clark01print.asp, 5 pages.

Dalton, Gregory, "Netscape Positions Itself as Business 'Intermediary'," InformationWeek, Jun. 8, 1998, No. 685, 1 page.

Greiner, Lynn, "At Your Service," Computer Dealer News, May 16, 2003, V. 19, No. 8, 1 page.

Irani, R., "Web Services Intermediaries—Adding Value to Web Services," Nov. 21, 2001, retrieved Aug. 2, 2005, from http://www.webservicesarchitect.com/content/articles.irani07print.asp, 5 pages.

Khare, R., "Whiz-Bangery, Indeed: Primordial's WSBANG," Nov. 16, 2001, retrieved Sep. 9, 2005, from http://lair.xent.com/pipermail/fork/2001-November/006569.html, 2 pages.

Lee, Yvonne L., "StrikeIron's Hot for Web Services," *SD Times*, Jun. 1, 2004, retrieved Sep. 12, 2005 from http://www.strikeiron.com/doc/SDTimes060104.pdf, 1 page.

Levitt, J., "From EDI to XML and UDDI: A Brief History of Web Services," Oct. 1, 2001, InformationWeek, retrieved Sep. 9, 2005, from http://www.informationweek.com/story/IWK20010928S0006, 3 pages.

Radding, A., "Generating Revenue from Web Services—Six Vendors With the Right Tools," Jan. 20, 2003, http://72.14.207.104/search?q=cache:W5EXBA4Lr54J:home. comcast.net/~alanradding/iaws.pdf+generating+revenue+from+web+services+radding&hl=en&gl=us&ct=clnk&cd=3, 4 pages.

Samtani, G., et al., "Integration Brokers and Web Services—Will Web Services Support Be Just Another Feature?" Jan. 30, 2002, retrieved Aug. 2, 2005, from http://www.webservicesarchitect.com/content/articles/samtani03print.asp, 5 pages.

Schofield, J., "The Third Era Starts Here," *The Guardian*, May 29, 2003, retrieved Nov. 4, 2003, from http://www.guardian.co.uk/print/0,3858,4678440-110837,00.html.

Siddiqui, B., "UDDI Based Electronic Marketplaces—Easier Integration With UDDI and WSDL," Feb. 20, 2002, retrieved Aug. 2, 2005, from http://www.webservicesarchitect.com/content/articles/siddiqui02print.asp, 4 pages.

Smith, Rick, "Striking While the Iron is Red Hot: StrikeIron Unveils Its Web Network," *LocalTechWire*, Jun. 25, 2004, retrieved Sep. 22, 2005 from http://www.localtechwire.com/article.cfm?u=8509, 3 pages.

Taft, Darryl K., "Start-Up Presents ASP Opportunity For Java Developers," *CRN*, Jul. 31, 2000, retrieved Sep. 20, 2005, from http://www.crn.com/sections/breakingnews/breakingnews.jhtml?articleId=18834381, 3 pages.

Tolksdorf, R., et al., "A Web Service Market Model Based On Dependencies," retrieved Sep. 9, 2005, from http://www.wiwiss.fu-berlin.de/suhl/bizer/pub/p49-tolksdorf.html, 4 pages.

Waldspurger C. A. et al., "Spawn: A Distributed Computational Economy," May 1989, Xerox Palo Alto Research Center, pp. 1-32.

Windley, Phillip J., "Drafting the Next Phase of Web Services," Infoworld, Dec. 1, 2003, V. 25, No. 47, 1 page.

\* cited by examiner

Example Customer Search Results From Web Store ZZZ

Search Results for "Map" in Item Type "Web Services"

| 111 WS Category | 112 Item Name | 113 Item Source | 114 Item Price | 115 Item Conditions Of Use | 116 Item ID | 117 Item Description |
|---|---|---|---|---|---|---|
| Mapping Services: 15 matches | | | | | | |
| 110a | AAA Street Maps By Street Address | WS Provider AAA | $0.05/use or $500/month | max uses/month=30000 | 0001342133 | Provides GIF images at up to 100M/inch |
| 110b | AAA Street Maps By Latitude/Longitude | WS Provider AAA | $0.08/use | available to subscribers to AAA GPS service | 0009287341 | Provides GIF images at up to 100M/inch |
| 110c | Driving Directions BBB | WS Provider BBB | $200/month | subject to Terms at www.bbb7.com/TC.htm | S072086133 | Textual driving directions and overview map |
| 110d | Driving Directions ZZZ | Web Store ZZZ | $0.05/use | - | 9874933245 | Textual driving directions for U.S. street addresses |
| 110e | Topographical Maps (high resolution) | WS Provider AAA | $0.10/use | - | 2987238765 | High resolution JPEG images at up to 30M/inch |
| 110f | Topographical Maps (low resolution) | WS Provider AAA | $0.02/use | - | 2981234778 | 640x480 resolution JPEG images at 100M/inch |
| 110g | see all matches in Mapping Services | | | | | |
| Scientific DBs: 3 matches | | | | | | |
| 110h | Human Genome Maps | WS Provider CCC | $0.01/use | non-commercial use only | 7813292254 | Genetic map information |
| 110i | see all matches in Scientific DBs | | | | | |
| Weather Services: 1 match | | | | | | |
| 110j | Live Weather Maps | Web Store ZZZ | $1/100 uses | not for use in composite WSs | 4397234563 | Current weather service maps worldwide |
| ... | | | | | | |

*Figure 1A*

Example Customer Shopping Screen for a Web Service Item

Welcome, Customer ABC. If you purchase a multi-use subscription today, you'll receive an additional 5% discount!

Example Web Service Registration Screen

Welcome, Web Service Provider DEF! Provide the information below to register a new Web Service available to customers of Web Store ZZZ. ⎯ 131

1. Specify a name for your Web Service being registered. ⎯ 133

| Current Location Maps For Portable Devices |

2. Optionally specify one or more terms related to the Web Service. ⎯ 134

| map, wireless location, portable |

3. Specify one or more usage prices for the Web Service.

| Usage Type | Restrictions | Price | |
   |---|---|---|---|
   | per use | | $1 | - 135a |
   | per month | maximum 500 uses/day | $4000 | - 135b |
   | per 1000 uses | | $800 | - 135c |

⎯ 135

:
   :

4. Specify any non-default conditions of use for the Web Service. ⎯ 136

|                                           |

5. Specify a description of the Web Service for customers. ⎯ 137

| For customers having portable devices whose location can be automatically determined (including GPS capabilities and most current cell phones), this Web Service includes a downloadable Java applet that can automatically retrieve and display a map of your current location upon request. |

| Register Web Service | ⎯ 139

*Figure 1C*

Example Web Services Information Screen

Web Services

| Top Web Services | WS Rank | WS Rating | Similar WSes | Customers Who Liked This WS Also Liked These WSes |
|---|---|---|---|---|
| ⋮ | | | | |
| Driving Directions ZZZ | 11 | ●●●●○ based on 1723 reviews | Driving Directions BBB, ... | AAA Street Maps By Street Address, ... |
| Live Weather Maps | 12 | ●●●●● based on 517 reviews | | Topographical Maps (high resolution) |
| ⋮ | | | | |

140, 140a, 140b, 141, 142, 143

Below are recommended Web Services for you, Customer JKL!

| Web Service | WS Price | WS Provider | ... | | |
|---|---|---|---|---|---|
| Human Genome Maps | $0.01/use | WS Provider CCC | ... | Add to Shopping Cart OR Subscribe Now |
| Live Weather Maps | $1/100 uses | Web Store ZZZ | | Add to Shopping Cart OR Subscribe Now |
| ⋮ | | | | | |

145, 145a, 145b, 146, 147

Write your online review of the selected Web Service  } 148

Customer Reviews
●●●●● Great Value!!, October 4, 200X
Reviewer: Customer MMM
Not only does this WS provide accurate and up-to-date information, it is a great value with its low per-use cost and lack of restrictive usage conditions!
⋮

PROVIDING PAID ACCESS TO REMOTE WEB SERVICE IN AN ELECTRONIC MARKETPLACE

CROSS REFERENCE TO RELATED APPLICATIONS

This application is a continuation of U.S. patent application Ser. No. 10/766,697, filed Jan. 27, 2004 now U.S. Pat. No. 7,433,835 and entitled "Providing a Marketplace for Web Services."

TECHNICAL FIELD

The following disclosure relates generally to facilitating interactions between computing systems, and more particularly to facilitating such interactions by acting as an intermediary, such as an electronic marketplace via which Web service providers make their Web services available and via which Web service consumers locate, purchase access to, and access those Web services in accordance with prices and use conditions specified for those Web services.

BACKGROUND

Various mechanisms exist to allow computers and executing software applications to interact. For example, remote procedure call ("RPC") protocols have long existed that allow a program on one computer to cause a program on another computer to be executed, and various object-oriented architectures such as CORBA ("Common Object Request Broker Architecture") and DCOM ("Distributed Component Object Model") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the World Wide Web ("Web") has provided additional opportunities for computers to inter-communicate. For example, much current Web use involves users interactively requesting Web pages from Web servers (e.g., via executing Web browser applications of the users) and receiving the requested information in response. In addition to such interactive user specification of requested information, there is also growing use of the Web to support the programmatic interaction of remote applications to exchange information via defined APIs ("application program interfaces"), referred to as Web services.

Web services allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Although Web services allow various applications and computers to interact, the current implementations and uses of Web services have various problems. For example, current Web service implementations are typically designed with only a very limited number of predefined applications interacting, and do not typically address a variety of issues for wide-scale interaction of providers and potential consumers of Web services. In addition, current Web service implementations do not typically provide effective means for potential consumers to discover or locate Web services that are desired or that may be of interest, such as via current UDDI-based implementations that may identify a connection point for one or more Web services but that do not typically provide any of a variety of other types of information related to the Web services to assist potential consumers (e.g., indications of usage by others, such as a ranking relative to other Web services; indications of comments and/or reviews by others; information related to the past provision of the Web service and/or the provider of the Web service, such as average up-time and response time; etc.). Current Web service implementations also do not typically provide sufficient assurance to potential consumers that prospective providers of Web services will reliably and accurately provide desired Web services, do not typically provide sufficient security for providers of Web services to ensure that their Web services will be made available only to authorized consumers and only in accordance with any conditions specified by the providers, do not typically provide easy-to-use mechanisms to allow Web service providers to collect specified payment for the use of their Web services by consumers, do not typically allow Web service providers to manage and monitor the use of their Web services, do not typically allow Web service consumers to monitor the use of provided Web services on their behalf, etc.

Thus, it would be beneficial to provide a solution that addresses these and other problems associated with the use of Web services and/or that otherwise facilitates the interaction of computer systems and executing applications.

BRIEF DESCRIPTION OF THE DRAWINGS

FIGS. 1A-1D illustrate examples of a user interface for Web service provider users and Web service consumer users to interact with an embodiment of a Web Services Marketplace ("WSM") system.

DETAILED DESCRIPTION

Figure 1B:
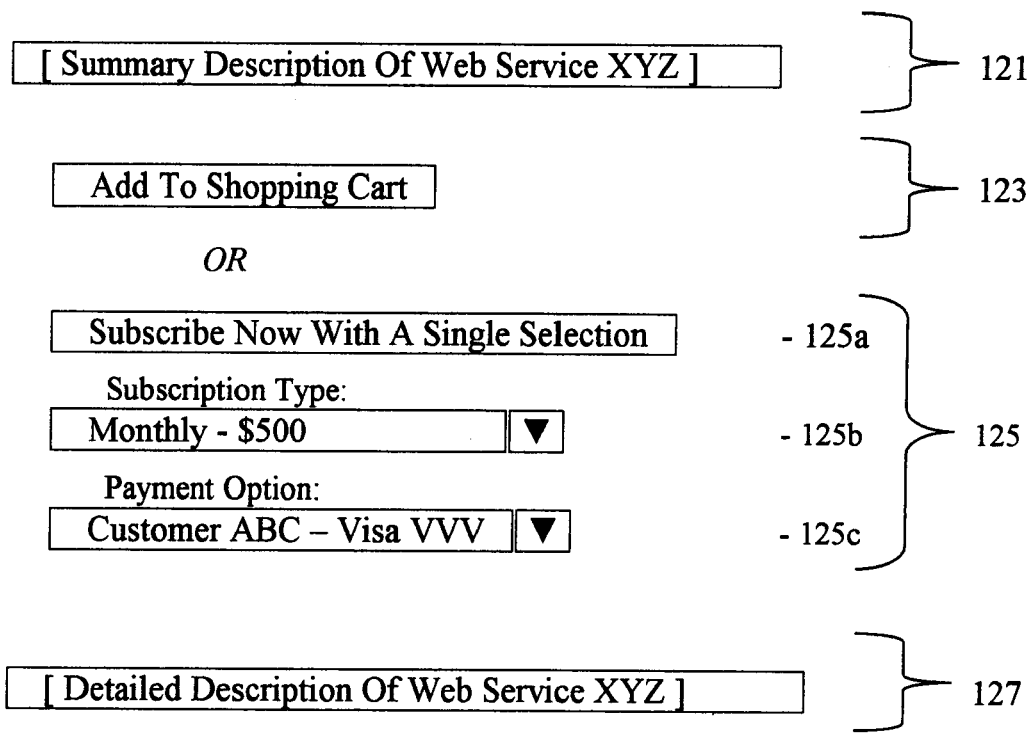

A software facility is described that facilitates interactions between computing systems, such as by in some embodiments providing an electronic Web service ("WS") marketplace via which third-party WS providers make their WSes available to third-party WS consumers who locate and purchase access to those WSes via the electronic marketplace.

In some embodiments, the WS marketplace ("WSM") allows third-party WS providers to register their WSes with the electronic marketplace so as to make those WSes available to some or all WSM users who are potential consumers of the WSes. In particular, in some embodiments, a WS provider may specify pricing information for the use of their WS and/or other WS use conditions at the time of WS registration. The WS providers also specify the manner(s) in which their WSes are to be invoked, as well as various description information about their WSes that may be provided to potential consumers to assist in their determination of whether to use the WS. Once WSes have been registered at the WSM, they can be made available to potential WS consumers in various ways, as discussed in greater detail below. In some embodiments, a WS provider may also need to first register with the WSM as a user before registering their WSes (e.g., to provide contact information, information on how payments to the WS provider are to be made, etc.).

As discussed in greater detail below, various types of use prices for using WSes can be specified, such as on a per-use basis, for a subscription that is valid for a specified length of time and/or number of uses, etc. Various non-price use conditions can similarly be specified in some embodiments, such as restrictions on types of consumers allowed to use the WS, restrictions on types of uses allowed for the WS and/or for any information provided by its use, restrictions on how frequently the WS can be used by a particular consumer or by all consumers, etc. In particular, in some embodiments each WS provider can specify one or more use prices for each WS that they register, and the WSM then sets one or more consumer access prices for those WSes that are each based on one or more of the specified use prices (e.g., access prices that are the same as the use prices, or instead that include additional fees charged by the WSM or a reduction in fees provided by the WSM).

After a potential WS consumer has identified a registered WS of interest, the potential WS consumer can interact with the WSM to obtain access to that WS, such as by providing an access fee payment based on an access price (if any) for the WS and by satisfying any other specified use conditions for the WS. In some embodiments, some or all consumers obtain access to registered WSes by purchasing subscriptions to those WSes for later use, and in some embodiments non-subscription use of registered WSes is provided. For example, one-time or limited non-subscription uses of a WS may be provided for a variety of reasons, such as to allow an evaluation or test use of a WS in order to determine whether to purchase additional uses, for use of registered WSes that are free, to allow anonymous access without a defined subscription, etc. As discussed in greater detail below, various types of subscriptions can be provided in various embodiments, including one-time use subscriptions, subscriptions for a specified length of time and/or number of uses, etc. In addition, in some embodiments a WS consumer may need to first register with the WSM as a user before obtaining access to registered WSes (e.g., to provide contact information, payment source information, formatting and protocol preferences for WS invocation response information, etc.).

When a consumer's access to a WS is authorized by the WSM but not provided immediately (e.g., by purchasing a subscription), the consumer will in some embodiments receive authorization information for use with later requests for the authorized access (e.g., a unique subscription ID for a purchased subscription, or a transaction ID for later-occurring non-subscription transactions). If so, the later requests from the consumer to provide the authorized access may include providing the previously received authorization information, and may further be supplied or specified in a manner indicated to the consumer at the time of original access authorization.

After receiving an access request from a consumer for current use of a registered WS, the WSM determines whether the use of the WS by the consumer is authorized, such as based on any authorization information supplied with the request. In addition, in some embodiments the WSM may further determine at the time of requested WS use whether any payment obligations and specified use conditions are currently satisfied for an invocation of the WS. If the WSM determines that the WS use is authorized, the WSM interacts with the provider of the WS to invoke the WS and obtain any response information. The WSM then provides some or all of the response information to the consumer.

In some embodiments, the WSM performs additional formatting of the response information before providing it to the consumer. The information formatting can be performed in various ways and for various purposes, such as to act as a translator/adapter that accommodates previously specified preferences of the WS consumer (e.g., information format and/or protocol preferences requested from the WS consumer when they previously registered with the WSM), to combine the response information with other information (e.g., response information from other invoked WSes), and to obfuscate information related to the invocation of the WS (e.g., the specific invocation request, information about the WS provider, information about the time of invocation of the WS, etc.).

In addition, in some embodiments the WSM may maintain one or more caches or other storage mechanisms to store response information from WS invocations, and if so may in some situations provide such stored response information to consumers rather than invoking the WSes to obtain additional response information (e.g., when the stored data was recently received and is of a type that is not time-sensitive and/or subject to rapid change)—such response information may in some embodiments include not only information provided by the WS as the product of the invocation, but also status or other response messages (e.g., for a WS that does not otherwise provide information in response to its invocation) or instead an indication that the WS does not provide any response. Such caching may provide benefits to both WS consumers (e.g., by providing response information even if a WS provider is not currently available, by providing response information more rapidly than if the WS was dynamically invoked, etc.) and to WS providers (e.g., by providing to WS consumers a service invocation volume higher than the WS provider can actually handle, by providing service to WS consumers even if the WS provider has temporarily throttled some or all requests to its WS, etc.).

As previously noted, potential WS consumers can identify WSes of interest in a variety of ways. In some embodiments, the WSM allows potential WS consumers to search the registered WSes in various ways, such as based on the type of service and/or type of data provided, on the use price, on the WS provider, on the WS description, etc. In addition, in some embodiments, the registered WSes may be categorized into groups of related WSes (e.g., in a hierarchical manner with one or more levels of sub-categories), and if so potential WS consumers may be able to browse within specified categories and sub-categories and/or may be able to limit their search to specified categories and sub-categories. Moreover, a variety of types of WS-related information may be provided to potential WS consumers, such as by providing lists or other indications of top-ranked and/or top-rated WSes, indications of recommended WSes (e.g., personalized to the current potential WS consumer based on information known about that consumer), etc.

In addition, after identifying one or more WSes of potential interest, a potential WS consumer may be able to review additional information about each WS, such as by receiving a Web page specific to a WS that includes description information for the WS and that optionally includes various other information about the WS (e.g., pricing information, information about the WS provider, etc.). In some embodiments, such WS-specific information may also include a variety of other types of information, including reviews of the WS by other WS consumers that have used the WS and/or summaries of such reviews, indications of rankings and/or ratings of the WS relative to other WSes based on various criteria (e.g., number of uses, a recent trend in use, consumer-specific ratings, etc.), indications of similar WSes (e.g., based on category) and/or otherwise related WSes (e.g., other WSes by the same WS provider, other WSes that have been used by other WS consumers that have previously used this WS, etc.).

In some embodiments, some or all of the described actions by WS providers and/or WS consumers are performed via user interactions with a Web site for the WSM, such as a Web site dedicated to providing a marketplace for Web services or instead a Web site of a more general Web store that provides various types of items (e.g., products and/or services) that include the Web services. Alternatively, in some embodiments, some or all interactions by the WS providers and/or WS consumers are instead performed by programs acting on behalf of the WS providers or consumers programmatically interacting with one or more computing systems of the WSM, such as via defined APIs (e.g., via Web services provided by the WSM to implement the underlying functionalities for the WSM)—in some embodiments, such APIs are based on the use of XML over HTTP (e.g., as part of the REpresentational State Transfer, or "REST", distributed interaction model that focuses on resources), while in other embodiments the APIs may be based on the use of SOAP and/or other protocols related to Web services.

In some embodiments, the WSM further provides a capability for WS providers and/or WS consumers to monitor and manage their interactions with the WSM, such as via a portal. For example, a registered WS provider may in some embodiments monitor their registered WSes, such as to determine the current level and/or a historical level of the use of those WSes by WS consumers, or instead to determine a current status of their WSes (e.g., to verify that their WSes are currently operating properly). In addition, WS providers may be able to manage various aspects of their registered WSes, such as to modify pricing information and other use condition information, or to dynamically specify current throttling conditions for the use of their WSes (e.g., to limit volume and/or type of use of the WSes for a specified period of time or until specified conditions are satisfied or until further notice). WS providers may also review and/or manage their user account information, such as to change their current contact information or to review payment amounts currently owed to the WS provider by the WSM. In a similar manner, registered WS consumers may monitor and manage their WS subscriptions or other WS access authorizations (e.g., to review recent use of their subscriptions and the amount of previously purchased or otherwise approved subscription use remaining, to dynamically specify current throttling or other restriction conditions for the use of their subscriptions, etc.), as well as review and manage their user account (e.g., to modify payment source information, or to authorize additional WS subscriptions or other WS use, such as by purchasing WSM-provided "points" that can later be used to pay for or authorize WS use).

As one example of another type of information that can be specified by WS providers and/or WS consumers in some embodiments (e.g., via the WSM portal or during registration), various types of notification requests may be specified for various types of information. For example, a WS provider may want to receive a standard email notification when the average volume of invocations of their WSes over a specified period of time exceeds a specified threshold, and may further wish to receive an urgent alert notification when one of their WSes goes offline or otherwise generates an error condition. Similarly, WS consumers may wish to receive notifications based on use or current status of their subscriptions, on the current availability of specified WSes and/or specified categories of WSes, on the current status of their user account information (e.g., the amount of WSM points remaining), etc. Such notification requests may include specifications of how to perform the notification, as well as the conditions that trigger the notification when they are satisfied. As the WSM operates, it monitors defined notification conditions in order to determine when notifications are appropriate, and performs the requested notifications in the manner specified.

In addition, while a WS subscription is in some embodiments limited to the particular WS consumer that created the subscription, in other embodiments a WS subscription may be shared among multiple different users. For example, in some embodiments a WS consumer may specify one or more affiliate users for one or more of their WS subscriptions, with each affiliate user given specified rights to use those WS subscriptions (e.g., authorization to make a specified total number of WS invocation requests based on the subscription or a specified limit on the volume of such WS invocation requests, a specification of conditions under which use of the subscription by an affiliate is allowed or disallowed, etc.). In addition, in some situations a WS consumer may create a WS subscription on behalf of an indicated application (or a specified copy or instance of such an application), such as an application developed and/or distributed by the WS consumer, and may specify that some or all users of that application are authorized to use that WS subscription in some or all situations. Conversely, in some embodiments such an application developer or distributor may instead incorporate one or more WS invocation requests as part of their application (whether or not in conjunction with a subscription by that WS consumer), but may instead limit some or all uses of those WS invocation requests by the application users such that those users may instead need to provide their own payment and/or subscriptions to those WSes in order to use that functionality of the application.

In some embodiments, composite Web services may also be registered with the WSM and used by WS consumers, with each composite WS able to invoke one or more other WSes. In addition, in some embodiments a composite WS may include specified logic related to how and when to invoke the other WSes (e.g., based on a scripting language), such as to provide conditional invocation of one WS based on the response information received from another WS. As one example, a composite WS may invoke two or more other WSes (e.g., WSes from WS providers unrelated to the creator of the composite WS) in order to obtain response information that is then aggregated to provide the response information for the composite WS, while as another example some or all of the WSes specified for the composite WS are provided by the composite WS creator and the composite WS specifies logic such that one of the specified WSes is invoked only if appropriate information is received from earlier invocation of another of the WSes (e.g., if that received information is to be used as part of that later invocation). In yet another example, a composite WS may invoke a single WS (e.g., from a WS provider other than the composite WS creator) in order to encapsulate that single WS using additional information and/or logic specified as part of the composite WS. In some embodiments, any third party can create and register composite WSes that invoke other WSes provided by other WS providers, while in other embodiments various restrictions may be imposed on the creation of such composite WSes (e.g., to limit composite WS creation to WS providers that provide at least one or all of the WSes that are part of the composite WS). In addition, in some embodiments such composite WSes can have their own specified pricing information and other use conditions, while in other embodiments such pricing and use conditions will instead be automatically determined based on the pricing and use conditions of the underlying WSes invoked by the composite WS.

Moreover, in some embodiments various third parties can interact with the WSM to obtain various additional functionality for themselves and/or to provide such additional functionality to other users. For example, in some embodiments external computing systems may provide WS coordination services to other users, with the computing systems defining WS coordination requests and interacting with the WSM to request satisfaction of those requests. Such coordination requests may in some embodiments specify other registered WSes to be invoked and/or specify various logic to be executed, thus providing capabilities similar to those of registered composite WSes without having to register those WS coordinations. The coordination requests may be supplied to the WSM for execution (e.g., for a fee charged by the WSM, or instead based on the specified pricing information for the WSes invoked by the coordination), and may be represented in various ways in various embodiments (e.g., as data structures, code modules, templates, mappings, portable code, etc.). In other embodiments, such third-party coordination services may instead execute the coordination logic for coordinations, such as by interacting with the WSM to individually invoke each WS for the coordination as specified by the logic for the coordination and then combining any resulting response information to be provided to the requester of the coordination (e.g., a user of the coordination service, such as for a fee).

In addition to coordination services, third parties can obtain and provide a variety of other types of functionality by interacting with the WSM. For example, in some embodiments some third parties may provide WSM agents that interact with the WSM to provide additional functionality to users, such as to monitor various aspects of the operation of the WSM in order to provide information or notifications to the user (e.g., in situations in which the WSM does not provide corresponding notification capabilities for the type of information being monitored by the agent, or instead to replicate a capability available from the WSM for a user who is not eligible to receive the information from the WSM). A variety of other types of interactions with the WSM can similarly be provided to enable various other types of additional functionality and capabilities.

As previously noted, in some embodiments some or all of the registered WSes may have specified pricing information such that WS consumers provide payment to use those WSes. In some embodiments, a variety of types of billing mechanisms are provided for WS consumers. For example, as previously noted, in some embodiments WS consumers may be able to purchase WS subscriptions that can then be used at later times, and in some embodiments the WSM may sell non-subscription WS access. In addition, in some embodiments billing occurrences are based on prior specified Service Level Agreements ("SLAs") with certain WS consumers and/or based on the Quality of Service ("QoS") requested by and/or actually provided to the consumer. For example, a provider of a WS may specify a use price for that WS that is based on one or more specified QoS levels provided by that WS provider in conjunction with the access to that WS (e.g., a maximum response time, a minimum level of accuracy of response information, etc.), such as the only use price for that WS or instead one of multiple use prices (e.g., with one or more of the other use prices having other specified QoS levels and/or no QoS levels), and if so access to that WS that is purchased based on that use price (e.g., a subscription purchased for an access fee based on that use price) is performed in accordance with those specified QoS levels when possible. Similarly, an operator of the WSM may in some embodiments specify an access price for each of one or more of the registered WSes that is based on one or more specified QoS levels provided by the WSM in conjunction with access to those WSes (e.g., a maximum response time, a minimum level of accuracy of response information, etc.), such as the only access price for a WS or instead one of multiple access prices for the WS (e.g., based on one or more specified use prices for the WS, with one or more of the other access prices having other specified QoS levels provided by the WSM and/or no QoS levels), and if so access to that WS that is purchased based on that access price is performed in accordance with those specified QoS levels when possible. In some embodiments, if access to a WS is not provided to a consumer in accordance with specified QoS levels purchased by that consumer and/or is not provided in accordance with any previously specified SLAs for that consumer, various additional actions may be taken to compensate the consumer (e.g., by providing a payment credit, by not counting that access as part of the paid access for the consumer, etc.) and/or to correct any problems (e.g., to correct any internal mechanisms of the electronic marketplace, such as by notifying appropriate personnel associated with the electronic marketplace; to correct performance of the provider of the WS, such as by notifying appropriate personnel associated with the WS provider and/or by providing a financial incentive to the WS provider, such as by delaying or reducing payment to that WS provider; etc.).

Moreover, in some embodiments WS consumers can obtain WSM-provided points that can be later used to purchase subscriptions and other WS access for various WSes—such points may be a WS payment option that WS consumers can purchase or otherwise earn (e.g., as a reward) for later use with a specified group of WSes and/or WS providers (e.g., all WSes and WS providers). The points for a WS may be identified to a potential WS consumer in various ways in various embodiments (e.g., displayed or otherwise accessible as a subscription or access price for some or all WSes, whether in addition to or instead of one or more prices in governmental currencies), and the determination of how many points are needed to purchase access to a WS subscription or other WS access may similarly be determined in various ways in various embodiments (e.g., by specifying and using a standard exchange rate for all WSes; by allowing each WS and/or WS provider to have an individualized specified exchange rate, such as one specified at registration time for the WS and/or WS provider; or by dynamically determining appropriate WSM points for a WS based on a variety of factors when the price is provided to a potential WS consumer, such as a current usage rate of the WS, other current conditions such as a current day/time, information about the WS consumer, etc.).

Similarly, in other embodiments the WSM may accumulate the costs of some or all of the WS uses for a consumer over a specified period of time, such as to provide a single monthly bill for all use of a specified WS or of all WSes.

In addition, in some embodiments the WSM provides various security and/or privacy mechanisms to ensure that only authorized WS providers can register and provide WSes and/or that only authorized WS consumers can subscribe to and/or access registered WSes. Such security and/or privacy can be provided in a variety of ways, including the use of passwords, public key encryption, digital certificates, etc. In addition, the WSM may use various security and/or privacy mechanisms with respect to management/monitoring interactions by WS consumers and/or WS providers, such as to provide information to users only when they are authorized to receive it and to allow modification of WS-related information and of subscriptions only when authorized. Similarly, in embodiments in which affiliates of WS consumers or other users are allowed at least some access to subscriptions of the WS consumer, various security and/or privacy mechanisms may be employed to ensure that the affiliates are authorized to receive any benefits and information provided to them.

Furthermore, in addition to having WSes provided by third-party WS providers and to providing access to registered WSes for third-party WS consumers, in some embodiments the WSM itself may act as a WS provider and/or WS consumer for one or more WSes, such as an alternative to other third-party provided WSes or instead to provide WSes that are not otherwise available to WS consumers. In addition, various other capabilities provided and used by the WSM may also be implemented as WSes, such as a WSM API available to WS providers and/or WS consumers, as well as internal capabilities used by the WSM (e.g., determining whether a specific subscription request for a WS satisfies the specified use conditions for that WS by invoking an internal WS that provides the service of comparing the specified use conditions and requested use information to determine whether the specified use conditions are satisfied).

In addition, as discussed in greater detail below, the WSM can also provide a variety of other types of functionalities and capabilities as described.

For illustrative purposes, some embodiments of the software facility are described below in which a specific WSM embodiment provides various specific types of capabilities and functionalities with respect to various specific types of WSes, and uses various specific types of user interfaces and other interactions to provide those functionalities and capabilities. However, those skilled in the art will appreciate that the techniques of the invention can be used in a wide variety of other situations, including with services and items other than Web services, and that the invention is not limited to the exemplary details provided.

FIGS. 1A-1D illustrate examples of a user interface provided by an embodiment of the WSM to assist WS provider users and WS consumer users in interacting with the WSM. In particular, FIG. 1A illustrates a user interface screen that provides information 110 about various registered WSes available via the WSM, which in this example are displayed to a potential WS consumer as search results in response to a search by the WS consumer for Web services related to the search term "map." In other embodiments, information about available WSes can be provided to WS consumers in a variety of ways. In addition, in this example embodiment the WSM is part of a Web store that provides to consumers a variety of types of items that include registered WSes.

In this example embodiment, various information about a number of available WSes 110a-110j is displayed to the potential customer, with the WSes divided into several WS categories 111 as shown. A variety of information is provided for each indicated WS, including a name 112, an indication of the WS provider 113 that is the source for the WS, one or more prices 114 corresponding to use of the WS, any specified use conditions 115 for the WS, and a description 117 of the WS. In this example, those types of information are provided by a WS provider when registering a WS, and each WS further has a unique item ID 116 that is automatically generated by the WSM, although in other embodiments such unique item IDs may not be used. As is shown, a variety of types of pricing models and use conditions are illustrated in this example.

FIG. 1B illustrates an example user interface screen via which a potential WS consumer can review information about an available WS and select to subscribe to the WS. In particular, the illustrated user interface includes a section 121 that provides a summary description of a particular WS and a section 127 that provides additional details about the WS. The user interface screen also includes a user-selectable control 123 via which the user can indicate to save an indication of the WS in a shopping cart of the user for possible later subscription. In addition, the user interface screen includes a section 125 via which the user can select to request a subscription to the WS, including a user-selectable control 125a to make the subscription request using the current information in user-modifiable fields 125b and 125c. In particular, field 125b may be provided for WSes that have multiple associated subscription types, such as a single-use subscription and a monthly subscription, and the user-modifiable field 125c corresponds to situations in which the user has multiple predefined sources of payment that they can select for use. Thus, in this example, before selecting the control 125a, the user may select a type of subscription (e.g., with a corresponding subscription price) and a payment option to be used for the payment. After the user selects the control 125a, the WSM determines whether to approve the subscription request, and if so takes appropriate steps to implement the subscription.

FIG. 1C illustrates an example user interface screen with which a WS provider can register a WS so as to make it available to consumers via the WSM. In particular, the example WS registration screen includes instructional information 131, and sections 133-137 in which the WS provider user can specify various types of information for the WS being registered, including a name, pricing information, use conditions, description, and one or more optional related terms (e.g., to assist in automatic categorization of the WS and/or to assist in identification of the WS as relevant to a potential consumer's search or other expression of interest about WSes). In this illustrated example, the pricing information section 135 allows the WS provider to specify one or more use prices for different types of subscriptions or other uses of the WS, although in other embodiments only a single type of pricing may be allowed. In addition, in some embodiments at least some of the registered WSes may not include some or all of the types of information, such as not including pricing information (e.g., for free WSes) or not including other types of use conditions. The illustrated WS registration screen also includes a user-selectable control 139 via which the WS provider can indicate to register the WS after appropriate information has been supplied. After the control has been selected, the WSM determines whether to approve the registration, and if so takes appropriate action to notify the WS provider of the acceptance and to make the registered WS available to consumers via the WSM.

FIG. 1D illustrates an example user interface screen via which various types of information about registered WSes can be provided to potential WS consumers. In particular the illustrated user interface screen includes a section 140 that provides various information about top-ranked WSes available via the WSM, such as to illustrate a current rank, a rating 141, indications of similar WSes 142, and indications of other WSes 143 that may be of interest based on preferences of other users. In this example, the WS ratings are user-specified and the ranks are automatically calculated in one of a variety of ways (e.g., cumulative sales volume, recent sales volume, recent trends in sales volume, accuracy or other performance measure for the WS, total usage based on the number of access requests or other usage measure, breadth of invocations based on the number of different WS consumers and/or applications making the access requests, number of access requests per second, etc.), although ratings and/or rankings could be determined in other ways in other embodiments.

The example user interface screen in FIG. 1D also includes a section 145 that provides various personalized recommendations of registered WSes to the current user, such as based on previously specified interests of the user and/or other automatic determinations of WSes of potential interest (e.g., based on usage history for the user). In this illustrated example, each of the recommended WSes 145a-145b is illustrated with various associated information, such as a corresponding use price and WS provider, and each additionally has an associated user-selectable control 146 with which the WS can be added to the user's shopping cart and a user-selectable control 147 with which the user can request to immediately subscribe to the WS. This illustrated user interface screen further includes various information related to user reviews of one or more WSes (e.g., of a WS selected in another portion of the screen, or of a particular WS indicated to the user), including a user-selectable control 148 with which the user can select to provide their own review and rating of the WS (e.g., after use of the WS) and a section 149 that includes various review and rating information for the WS provided by one or more other users. While these various types of WS-related information are illustrated on a single screen in this example, in other embodiments some or all of the information could be provided at other times and in other manners (e.g., by providing review and rating information for a WS on a detail screen for that WS, such as the screen illustrated in FIG. 1B).

In addition, in some embodiments the user interface may include one or more screens that allow the user to specify security and/or privacy information as desired. For example, a WS consumer may be able to prohibit or otherwise restrict access to WSes on their behalf (e.g., for all or a specified subset of their subscriptions) based on various user-configurable settings, including based on IP addresses associated with WSes, on developer tokens associated with users making WS access requests, on referring URLs, on subscriber ID, via cookies, etc. A WS provider may similarly be able to prohibit or otherwise restrict access to WSes that they provide in a variety of ways, and WS providers and WS consumers may in some embodiments be able to specify various security and/or privacy information for use in accessing information about their accounts and provided and/or accessed WSes.

Figure 2:
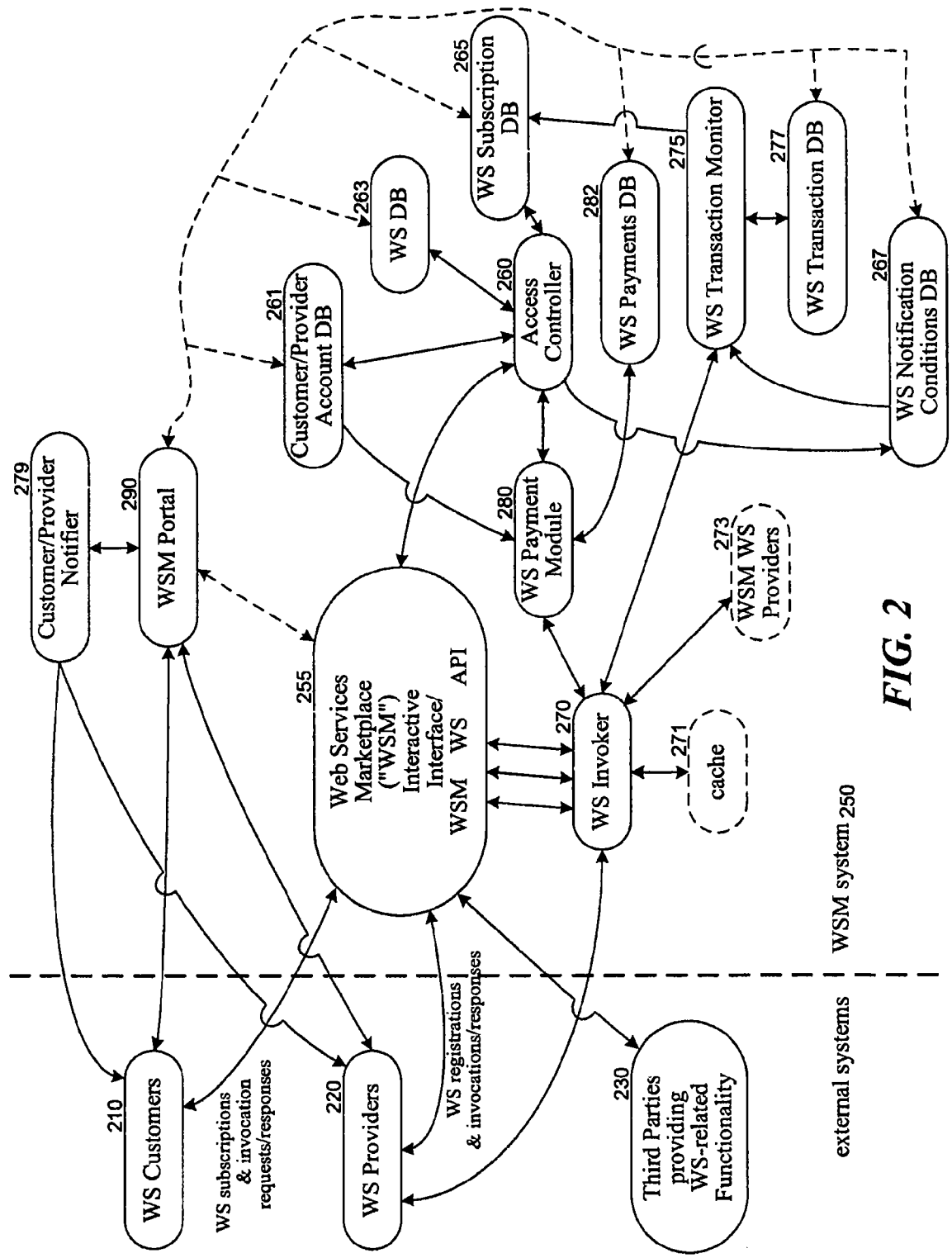
FIG. 2 is a network diagram illustrating components and information flow of an example embodiment of the WSM system.

FIG. 2 is a network diagram illustrating components and information flow of an example embodiment of the WSM system and of various external computing systems and users interacting with the WSM system. In particular, in the illustrated embodiment various WS consumers 210 and WS providers 220 external to the illustrated WSM system 250 interact with the WSM system to register, identify, subscribe to, and obtain access to WSes. In addition, in this example embodiment various optional third parties 230 external to the WSM system may also interact with the system to receive or provide various enhanced or alternative capabilities and functionalities.

In particular, WS providers interact with a front-end interface 255 of the WSM system to register WSes, as well as in some embodiments to initially register themselves as users of the WSM system (e.g., as WS provider users). In the illustrated embodiment, the front-end interface 255 may be a Web site with which the user interacts and/or an API (e.g., a WS API) with which external computing systems and executing applications interact, although in other embodiments other types of front-end interfaces may alternatively be used.

In this illustrated embodiment, after the front end 255 receives a registration request for a WS provider or for a WS available from the provider, corresponding information is forwarded to an Access Controller component 260 of the WSM system to determine whether to approve the request (e.g., based on whether sufficient appropriate information was provided, and/or on whether other predefined criteria have been satisfied), and indicates to the front end whether the request was approved. In addition, the Access Controller component stores information about the registered WS or WS provider for later use in a WS database 263 or Consumer/Provider User Account database 261, respectively.

In a similar manner, WS consumers interact with the front end to obtain information about available WSes, to subscribe to or otherwise request access to available WSes, and in some embodiments to initially register with the WSM as a user (e.g., a WS consumer user) prior to such subscription/access requests. As with registration requests from WS providers, the front end forwards information regarding WS consumer registration, subscription, and access requests to the Access Controller for determination of whether to approve the requests, and the Access Controller responds to the front end in an appropriate manner. The Access Controller also stores information about registered consumers in the Account database 261 and about registered subscriptions to WSes and other WS access authorizations in the WS subscription database 265.

In other embodiments, some or all such information could instead be stored in other manners, such as to maintain separate account database information for WS consumers and WS providers, or to instead maintain subscription information along with other user information in the Account database. In addition, in embodiments in which WS providers and/or WS consumers can specify notification requests (e.g., at the time of user registration), such information is also forwarded to the Access Controller, which stores the information as appropriate in the WS Notification Conditions database 267 for later use.

In the illustrated embodiment, the WSM system further includes a WSM Portal component 290 with which WS consumers and WS providers can interact to obtain information about their accounts and to perform other interactions with the WSM system, such as to monitor and/or manage WS-related information. In some embodiments, the WSM Portal interacts with the front-end interface to perform requested retrievals and modifications of information, while in other embodiments instead interacts directly with the various databases 261, 263, 265, 267, 277 and 282 as appropriate.

When a WS access request is received from a WS consumer and the Access Controller approves the request, the front end interacts with a WS Invoker component 270 to perform invocation of one or more WSes as appropriate, such as based on information retrieved from the WS database and/or received from the front end. The WS Invoker component then interacts with one or more WS providers as appropriate to invoke the appropriate WSes and to receive response information. In some embodiments, the WS Invoker stores received response information in an optional cache 272 for later use, such as to use in lieu of a WS invocation in certain situations as appropriate. In addition, in some embodiments one or more of the WS providers from which the WS Invoker may invoke WSes can be one or more optional internal WSM WS providers 273. After obtaining the appropriate response information, whether from a WS provider or from the cache, the WS Invoker component returns the response information to the front end. In some embodiments, the front-end interface performs additional processing on the received response information before providing it to the requesting WS consumer, such as to aggregate information from multiple invoked WSes and/or to format the response information in accordance with previously specified preferences for the WS consumer.

In addition, in the illustrated embodiment the WS Invoker component also provides information to a WS Transaction Monitor component 275 regarding some or all processed WS invocation requests, such as for all requests whether satisfied from the cache or from a WS provider, or instead only for successful requests to an external WS provider. In the illustrated embodiment, the WS Transaction Monitor component in turn stores information about the transactions in a WS Transaction database 277 as appropriate. In addition, in the illustrated embodiment the WS Transaction Monitor component reviews information in the WS Notification Conditions database to determine whether transactions and/or other status information have triggered one or more specified notification conditions, such as after each transaction or instead on a periodic basis. When the WS Transaction Monitor component determines that one or more notifications have been triggered, the component forwards corresponding information to a Customer/Provider Notifier component 279 to perform notifications to WS consumers and/or WS providers as appropriate.

When a received request by the Access Controller and/or WS Invoker corresponds to payment that needs to be obtained (e.g., for subscription requests or other WS access requests), one or more of the components interact with a WS Payment Module component 280 in the illustrated embodiment to provide information about the corresponding request or transaction, although in other embodiments the front end could instead interact directly with the Payment Module. The Payment Module then determines appropriate payment that is needed (e.g., by receiving the information from another component and/or by retrieving appropriate information from one or more of the databases, such as the WS Subscription database, WS database and/or Account database), and performs the necessary functions to obtain the payment, such as in accordance with previously provided payment source information and any specified preferences. The Payment Module also stores information about the payments obtained from WS consumers and any corresponding payments owed to WS providers in a WS Payments database 282.

As previously noted, in some embodiments one or more third-party systems or users 230 may additionally be present to interact with the WSM system, such as via the front-end interface. As discussed in greater detail elsewhere, such third-party systems may provide a variety of types of services and functionalities, including coordination, agent-based monitoring, etc.

Figure 3:
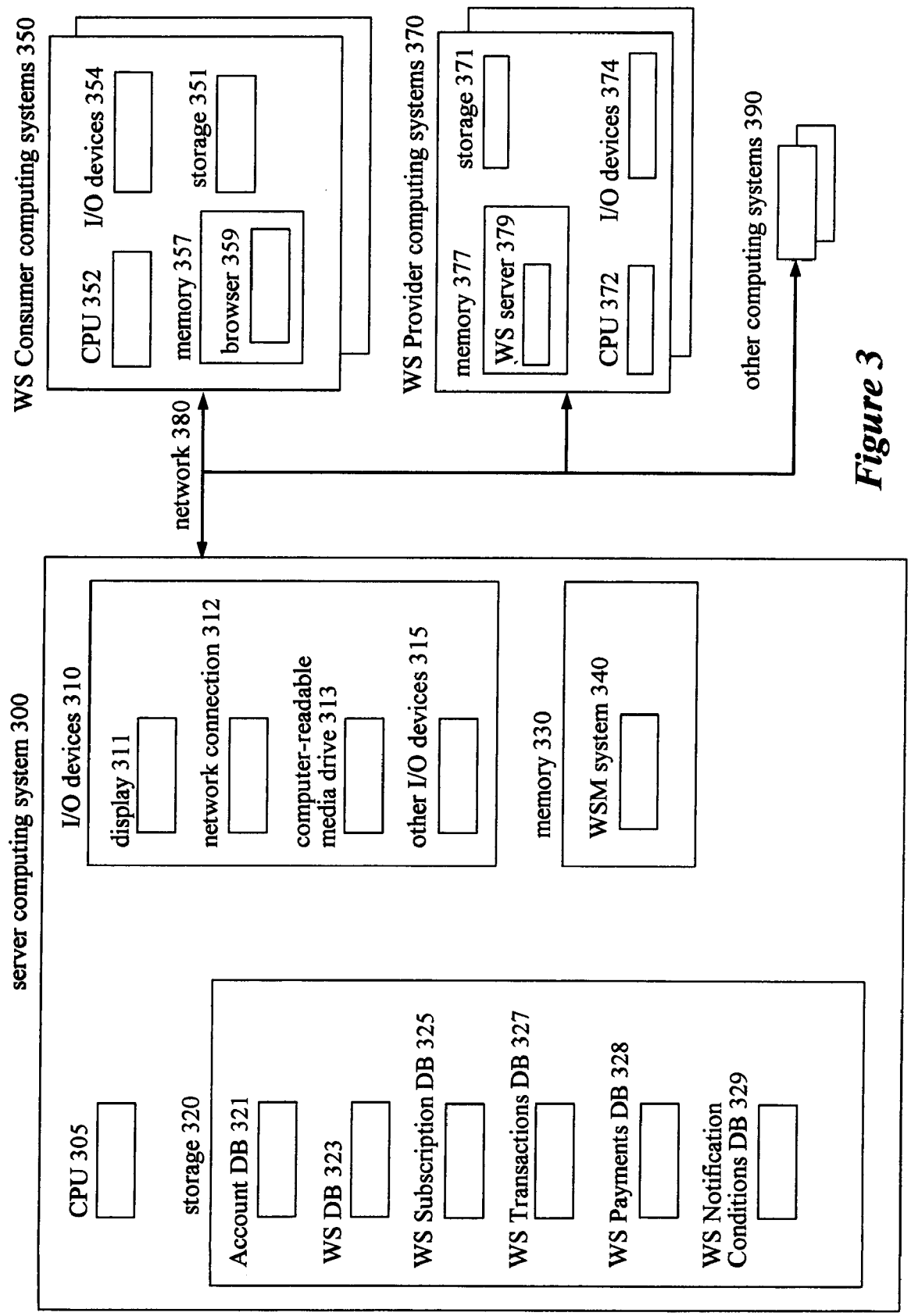
FIG. 3 is a block diagram illustrating an embodiment of a computing system suitable for executing an embodiment of the WSM system.

FIG. 3 illustrates a server computing system 300 suitable for executing an embodiment of the Web Services Marketplace ("WSM") system facility, as well as various WS consumer computing systems 350, WS provider computing systems 370, and other computing systems 390. In the illustrated embodiment, the server computing system includes a CPU 305, various I/O devices 310, storage 320, and memory 330. The I/O devices include a display 311, a network connection 312, a computer-readable media drive 313, and other I/O devices 315.

An embodiment of the WSM system 340 is executing in memory, and it interacts with the other computing systems over the network 380 using the network connection 312 (e.g., via the Internet and/or the World Wide Web). The other computing systems can similarly execute various information as part of the interactions, such as a Web browser 359 executing in memory 357 of the WS consumer computing systems to allow users of the systems to interact with the WSM system, and such as a WS server 379 executing in memory 377 of the WS provider computing systems to provide Web service functionality. Such other computing systems also include a variety of I/O devices in the illustrated embodiment, including network connections to communicate with each other and the server computing system over the network. In addition, in the illustrated embodiment a variety of datastores (e.g., databases) 321, 323, 325, 327, 328 and 329 are present on the storage 320 for use by the WSM system, although in other embodiments some or all such databases may instead be located elsewhere and/or be organized in other manners.

Those skilled in the art will appreciate that the illustrated computing systems are merely illustrative and are not intended to limit the scope of the present invention. Computing system 300 may be connected to other devices that are not illustrated, including through one or more networks such as the Internet or via the Web. More generally, the "server" and other computing systems may comprise any combination of hardware or software that can interact in the manners described, including computers, network devices, internet appliances, PDAs, wireless phones, pagers, electronic organizers, television-based systems and various other consumer products that include inter-communication capabilities. In addition, the functionality provided by the WSM system components illustrated in FIG. 2 may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the WSM system components or data structures may also be stored (e.g., as instructions or structured data) on a computer-readable medium, such as a hard disk, a memory, a network, or a portable article to be read by an appropriate drive. The WSM system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 4:
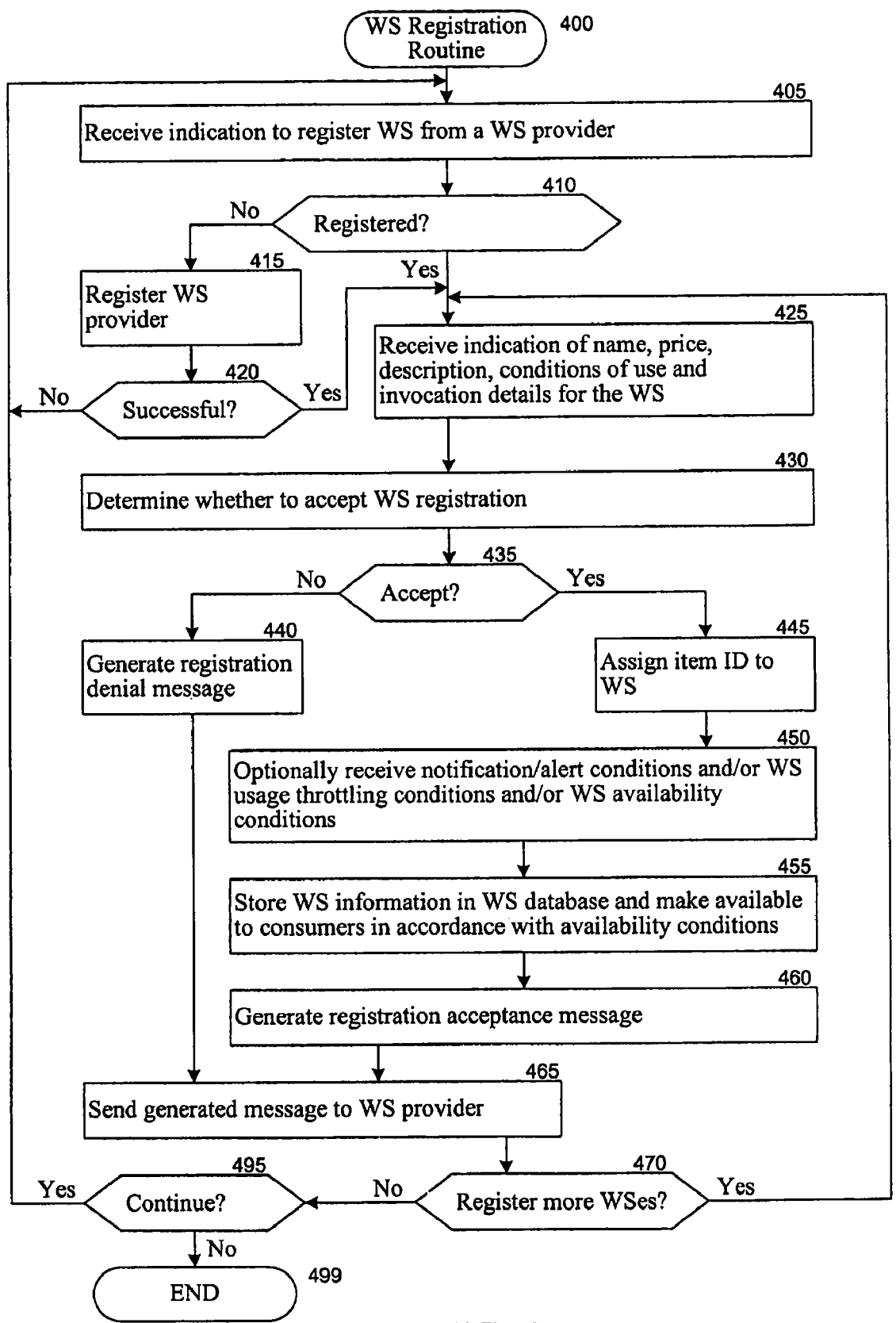
FIG. 4 is a flow diagram of an embodiment of the WS Registration routine.

FIG. 4 is a flow diagram of an embodiment of the WS Registration routine 400. The routine processes requests from WS providers to register WSes at the WSM for use by WS consumers.

The routine begins at step 405 where an indication is received from a WS provider to register a WS. The routine continues in the illustrated embodiment to step 410 to determine whether the WS provider is a registered user of the WSM, and if not continues to step 415 to attempt to register the WS provider (e.g., by obtaining contact information for the WS provider, information about how to provide payment to the WS provider based on use of the provider's registered WSes by WS consumers, etc.). After step 415, the routine continues to step 420 to determine whether the registration of the WS provider was successful. If so, or if it was instead determined in step 410 that the WS provider was already registered as a user (or did not need to be registered as a user), the routine continues to step 425 to receive an indication from the WS provider of various information corresponding to the WS being registered, such as a name, one or more use prices, a description for use by potential consumers, other non-price use conditions, and invocation details for the WS. In some embodiments, such information may instead be received as part of step 405.

After step 425, the routine continues to step 430 to determine whether to accept the WS registration, such as based on an automated determination (e.g., on whether appropriate information has been supplied and any predefined criteria had been satisfied) and/or a manual determination (e.g., by a user representing the WSM based on whether the WS is appropriate for the WSM). In step 435, the routine determines whether the registration was accepted, and if not continues to step 440 to generate a registration denial message for the WS provider. If it was instead determined in step 435 that the registration was accepted, the routine continues instead to step 445 to assign a unique item ID to the WS for use by the WSM system in tracking various information related to the WS. The routine then continues to step 450 to optionally receive one or more of various types of information related to the WS, such as any use throttling conditions (e.g., limits on how many invocation requests to allow for the service), availability conditions (e.g., times at which the WS is not available or other conditions under which the WS is available or not available), notification conditions related to the WS, etc. The routine then continues to step 455 to store the various received information related to the WS in one or more databases as appropriate, and then makes the registered WS available to potential consumers in accordance with any availability conditions. In step 460, the routine then generates a registration acceptance message for the WS provider.

After steps 440 or 460, the routine continues to step 465 to send the generated message to the WS provider, and optionally provides additional information related to the registration (e.g., the assigned item ID). In step 470, the routine then determines whether to register more WSes for this WS provider, and if so returns to step 425. If not, the routine continues to step 495 to determine whether to continue. If so, or if it was instead determined in step 420 that the WS provider registration was not successful, the routine returns to step 405. If the routine instead determines not to continue, the routine continues to step 499 and ends. While not illustrated here, in some embodiments the routine could additionally use various security information and/or mechanisms, such as to ensure that only authorized WS providers can register new WSes. In addition, as previously described, in some embodiments the routine may be provided as part of a user's interaction with a Web site or other interactive interface, while in other embodiments the routine may be performed as part of a programmatically accessed API.

Figure 5:
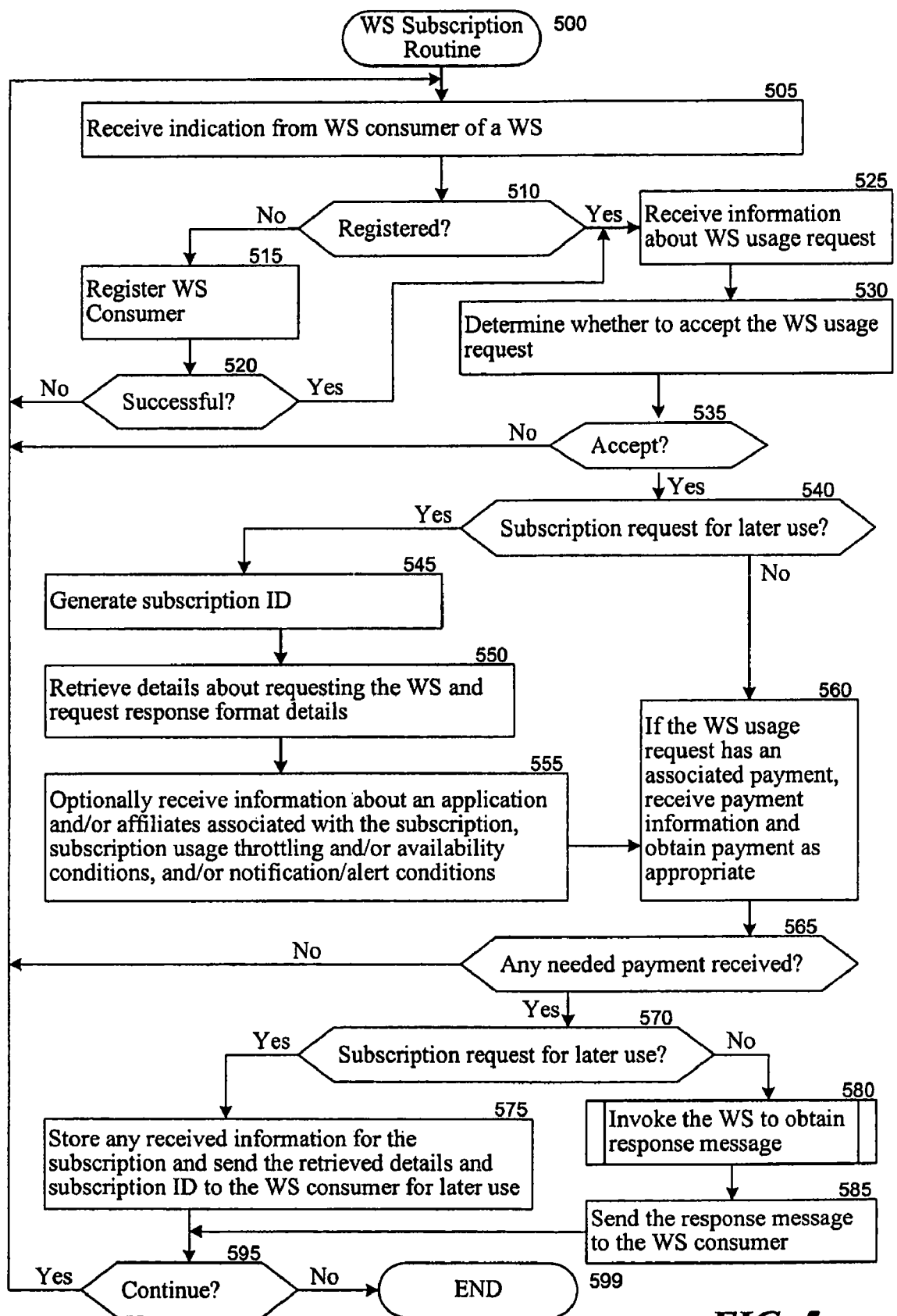
FIG. 5 is a flow diagram of an embodiment of the WS Subscription routine.

FIG. 5 is a flow diagram of an embodiment of the WS Subscription routine 500. The routine receives requests from WS consumers to subscribe to specified WSes, and responds as appropriate. As described in greater detail elsewhere, a WS consumer can identify WSes of potential interest in a variety of ways prior to selecting one or more of those WSes for subscription. In addition, in the illustrated embodiment a WS consumer can both subscribe to WSes for later access or instead request immediate access without a subscription, although in other embodiments only one of the types of access requests may be provided.

The routine begins at step 505 where an indication is received from a WS consumer of a WS of interest. The routine continues to step 510 to determine whether the WS consumer is a registered user of the WSM system, and if not continues to step 515 to attempt to register the WS consumer (e.g., by obtaining contact information, payment source information, information about any associated applications and/or affiliates if the consumer is a developer of one or more application programs, preferences for how to receive information, etc.). The routine then continues to step 520 to determine whether the registration of the consumer was successful. If so, or if it was instead determined in step 510 that the WS consumer was already registered (or that registration of the consumer was not needed), the routine continues to step 525 to receive information about a WS use request from the WS consumer, although in other embodiments such information may instead have been received in step 505. As an example, the WS use request may include an indication of a unique item ID associated with the WS, an indication of the type of use request (e.g., a subscription request), preference information for how to receive response information from the WS, payment information if needed for the WS, a type of intended use of the WS, etc.

After step 525, the routine continues to step 530 to determine whether to accept the WS use request, such as based on whether the request contains sufficient appropriate information, on whether any needed payment can be obtained based on the request or other information for the WS consumer, on whether the WS consumer and/or request satisfies any other specified use conditions for the WS, whether the use request would exceed any throttling condition specified for the WS, etc. The routine continues to step 540 if it was determined in step 535 that the request was accepted in order to determine whether the use request was a subscription request for later use. If so, the routine continues to step 545 to generate a subscription ID corresponding to the subscription for later use by the WS consumer during access requests corresponding to the subscription. In step 550, the routine then retrieves details about how the consumer should request the WS and about the format of any response information. In step 555, the routine then optionally receives one or more of a variety of types of information related to the subscription, such as any notification conditions related to the subscription, any application and/or affiliates associated with the subscription, any subscription use throttling and/or availability conditions (e.g., to restrict it use by affiliates), etc.

After step 555, or if it was instead determined in step 540 that the use request was a non-subscription request for immediate access, the routine continues to step 560 to obtain payment for the subscription or immediate access if needed, such as based on any payment source information received or previously associated with the WS consumer. After step 560, the routine continues to step 565 to determine whether any needed payment was received, and if so continues to step 570 to again determine whether the use request was a subscription for later use. If so, the routine continues to step 575 to store any received information for the subscription and to send the generated subscription ID and the retrieved details about how to request the WS to the WS consumer for later use. If it was instead determined in step 570 that the use request was a non-subscription request for immediate access, the routine continues to step 580 to execute a routine to invoke the Web service to obtain response information as appropriate. In step 585, any response information received in step 580 is then sent to the WS consumer.

After steps 575 or 585, the routine continues to step 595 to determine whether to continue, and if not continues to step 599 and ends. If it was instead determined in step 595 to continue, or in step 520 that the WS consumer registration was not successful, or in step 535 that the WS use request was not accepted, or in step 565 that any needed payment was not received, the routine returns to step 505.

As with the WS registration routine, the illustrated routine can be provided in various ways in various embodiments, including as part of an interactive Web site with which a WS consumer user interacts and/or as part of a programmatically accessed API. In addition, while not illustrated here, in some embodiments various security information and/or mechanisms may be used, such as to ensure that only authorized WS consumers are allowed to subscribe to some or all WSes and/or to perform immediate WS access requests without subscriptions.

Figure 6:
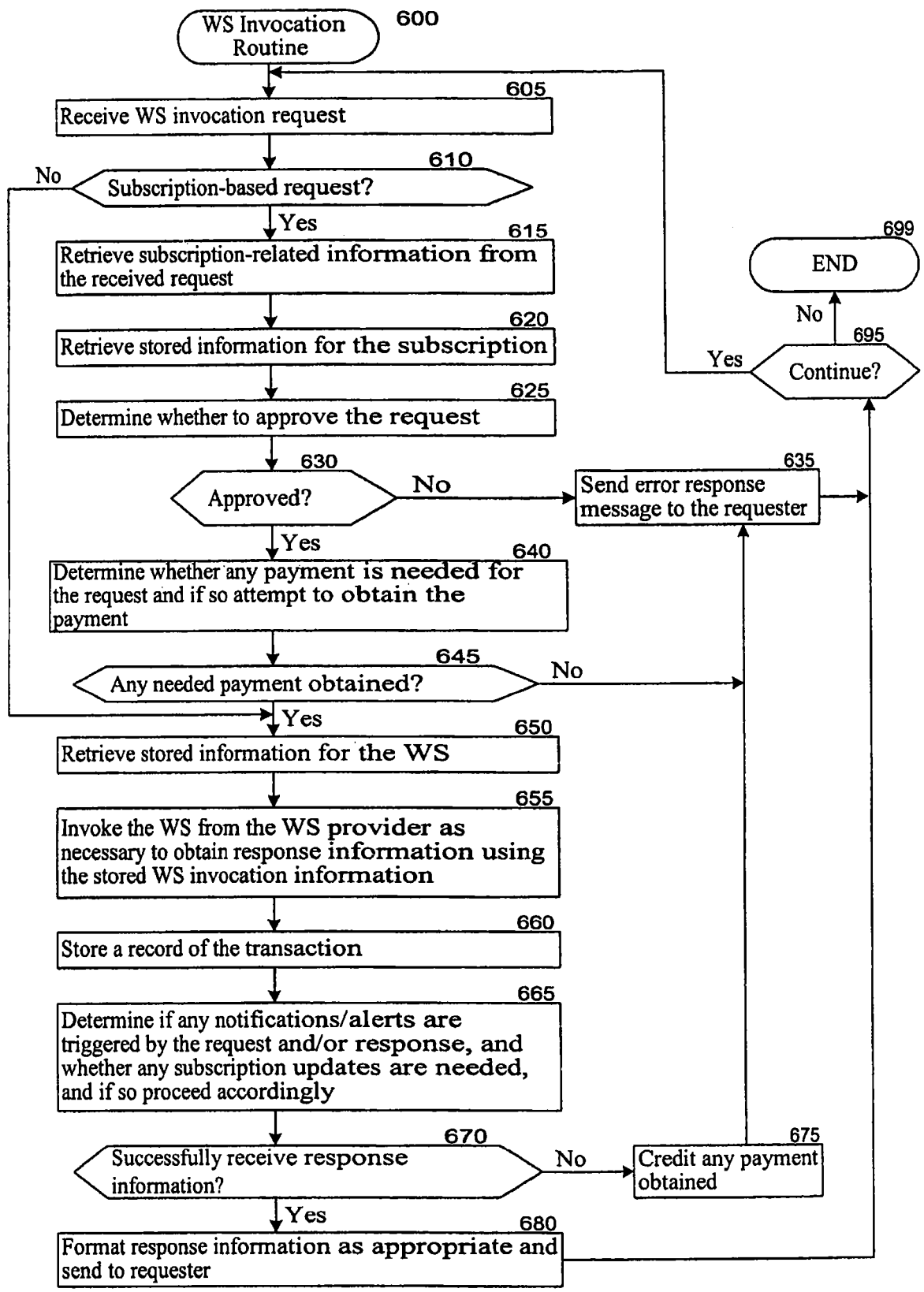
FIG. 6 is a flow diagram of an embodiment of a WS Invocation routine.

FIG. 6 is a flow diagram of an embodiment of a WS Invocation routine 600. The routine receives access requests for WSes from consumers, and responds by providing access to the WSes via invocations of the WSes on behalf of the consumers when appropriate.

The routine begins at step 605 where a WS access request is received, such as based on a previously created subscription. The routine continues to 610 to determine whether the access request is a subscription-based request (e.g., based on whether a subscription ID is received as part of the request) or instead if an indication is received that the access request is for immediate invocation without a subscription (e.g., such as based on a message received from the WS Subscription routine illustrated in FIG. 5 as part of the execution of step 580).

If it is determined in step 610 that the WS invocation request is a subscription-based request, the routine continues to step 615 to retrieve subscription-related information from the received request, such as an indication of the subscription ID for the subscription and of the identity of the WS consumer. In step 620, the routine then retrieves stored information for the subscription, and in step 625 determines whether to approve the request, such as based on whether the subscription is valid, whether any current subscription-based throttling conditions and/or WS-based throttling conditions are satisfied, whether the requesting user is authorized to use the subscription in the requested manner (e.g., is an authorized affiliate for the subscription), etc. If it is determined in step 630 that the request is not approved, the routine continues to step 635 to send an error response message to the requester and to store information about the error, but otherwise continues to step 640 to determine whether any payment is needed for the request, and if so to attempt to obtain the payment (e.g., for purchased subscriptions in which an additional per-access charge applies, or for subscriptions that a WS consumer has established such that affiliates using the subscription provide their own payment for their use). As discussed elsewhere, payment can be obtained in various ways in various embodiments, including by dynamically purchasing a subscription or other access (e.g., as a credit card transaction), via use of previously acquired WSM points, etc. If it is determined in step 645 that needed payment is not obtained, the routine continues to step 635.

If it is instead determined in step 645 that any needed payment is obtained, or in step 610 that the received request was not a subscription-based request, the routine continues instead to step 650 to retrieve stored information for the WS including information about how to invoke the WS. The routine then continues to step 655 to invoke the WS from the WS provider as necessary to obtain response information using the retrieved WS invocation information. While not illustrated here, in some embodiments retrieved information may be stored in a cache or other storage mechanism, and such cached/stored information may be considered for use rather than invoking the WS from a WS provider. In addition, in some embodiments step 655 may be performed regardless of the validation actions in step 625 as to whether to approve the request and in step 645 whether any needed payment was obtained, such as to perform step 655 in parallel with such validation steps and to handle any failure of those steps by not providing to the requester any response information and/or other benefits resulting from the WS invocation. After step 655, the routine continues to step 660 to store a record of the WS access transaction.

In step 665, the routine then determines if any notification conditions have been triggered by the request and/or response, as well as whether any other subscription updates are needed (e.g., to update a subscription after the last authorized use has been made so that any next attempt to use a subscription would fail), and if so the routine proceeds accordingly to provide such notifications and/or perform such subscription updates. After step 665, the routine continues to step 670 to determine whether response information was successfully received from the WS service invocation, and if not continues to 675 to credit any payment obtained in step 640 before continuing to step 635 (in other embodiments, payment may not be obtained until after successful invocation to prevent such payment credits, or instead payment may be retained even if the invocation fails). If it is determined in step 670 that response information was successfully received, the routine continues to step 680 to format the response information as appropriate for the requester (e.g., based on previously specified preferences), and then sends the formatted response information to the requester. After steps 635 or 680, the routine continues to step 695 to determine whether to continue. If so, the routine returns to step 605, and if not the routine continues to step 699 and ends.

As with the registration and subscription routines, the WS Invocation routine can be performed in various ways in various embodiments, such as part of an interactive Web site in response to an explicit user request or instead as part of a programmatically accessed API. In addition, in some embodiments various security information and/or mechanisms may be employed, such as to ensure that only authorized WS consumers are able to invoke WSes and that any WS to be invoked is from an authorized WS provider. In addition, in some embodiments the information provided to a WS consumer about how to request a WS invocation and any invocation response information returned to the WS consumer is formatted in such a way as to obfuscate or mask various types of information, such as the details about how to perform the actual invocation request to the WS provider and/or identity or other information about the WS provider—in this way, the WSM system is able to ensure that any invocation request to WS providers come from the WSM system and are thus authorized. Alternatively, in other embodiments, the WSM system may not serve as an intermediary for the invocation of some or all WSes, such as by providing to WS consumers the details about how to directly interact with a WS provider to invoke a subscribed-to or otherwise access-approved WS. For example, in some embodiments, when a WS consumer has purchased or otherwise acquired access to a WS, the WSM system could provide access authorization information to the consumer to allow the consumer to obtain access to the WS directly from the provider of the WS, such as details about how to access the WS and/or a token or other indication that the WS provider can identify (and optionally verify) as having being supplied by the WSM system when the provider receives the information from the WS consumer (e.g., a digital signature; information indicating vending payment to the WSM, such as transferable WSM points that can be used by the WS provider to receive compensation from the WSM system; etc.).

Figure 7:
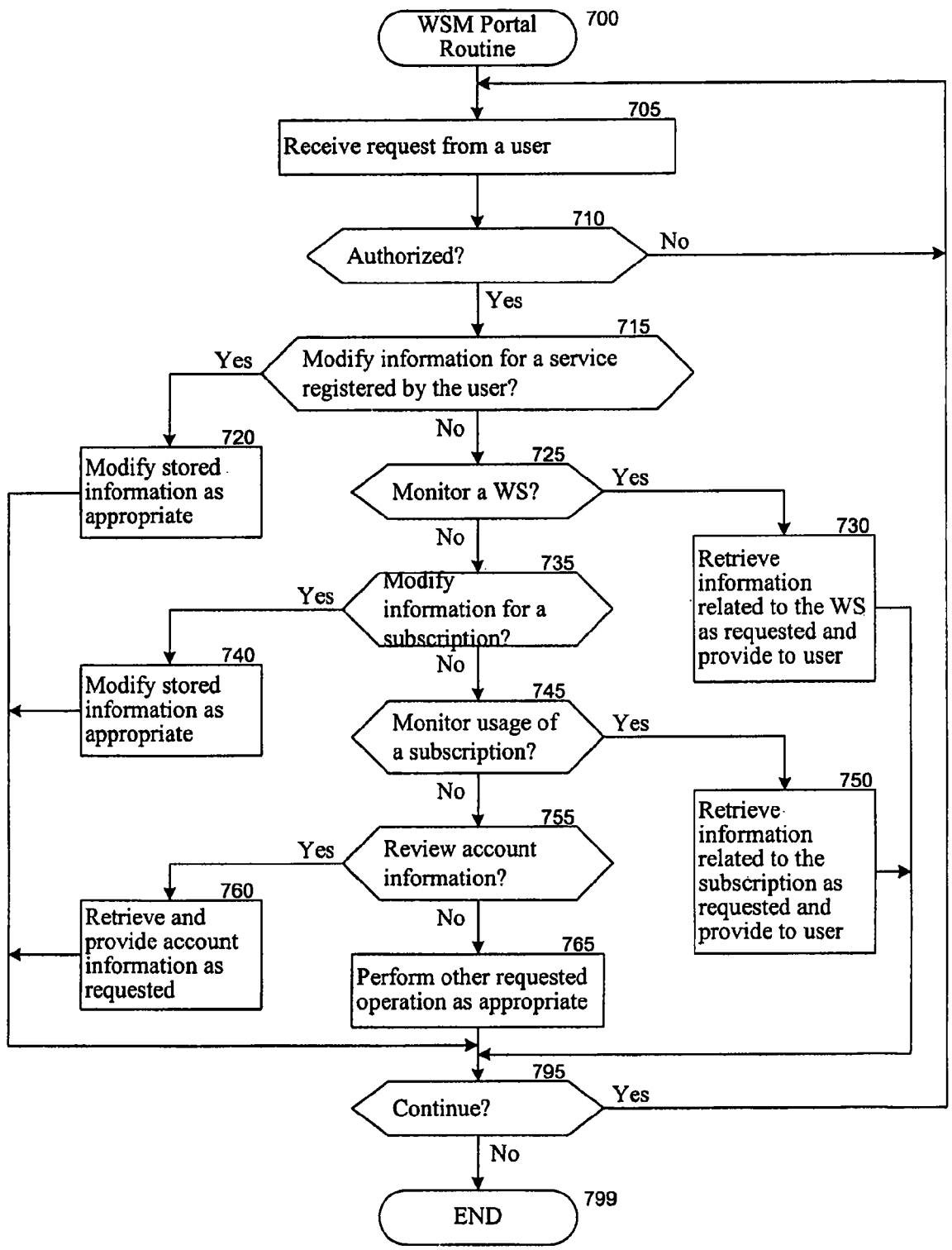
FIG. 7 is a flow diagram of the WSM Portal routine.

FIG. 7 is a flow diagram of the WSM Portal routine 700. The routine allows WS providers and/or WS consumers to interact with the WSM system to monitor WS status and use and to manage registered WSes and subscriptions.

The routine begins at step 705, where a request is received from a user. In step 710, the routine determines whether the user is authorized to make the request, such as based on security information and associated access privileges for the user. If it is determined that the user and request are authorized, the routine continues to step 715 to determine whether the request is from a WS provider user to modify information for a WS registered by the user, and if so continues to step 720 to modify the stored information as appropriate. If it was instead determined that the request was not to modify information for a registered WS, the routine continues instead to step 725 to determine whether the request was to monitor a Web service (e.g., from the Web service provider user that registered the WS), and if so continues to step 730 to retrieve information related to the WS as requested and provide it to the user (e.g., information about current status of the WS and/or usage of the WS).

If it was determined that the received request was not to monitor a WS, the routine continues instead to step 735 to determine whether the request was from a WS consumer user to modify a subscription for the user, and if so continues to step 740 to modify the stored information as appropriate. If the request was not to modify information for a subscription, the routine continues instead to step 745 to determine whether the request is to monitor use of a subscription (e.g., from a WS consumer that created the subscription), and if so continues to step 750 to retrieve information related to the subscription as requested and provide it to the user (e.g., information about use of a subscription by affiliates).

If it was instead determined that the request was not to monitor use of a subscription, the routine continues to step 755 to determine whether the request was to review account information for the user, and if so continue to step 760 to retrieve and provide account information to the user as requested. If the request was not to review account information, the routine continues instead to step 765 to perform another requested operation if appropriate, such as to modify the user's account (e.g., by purchasing additional WSM points or otherwise providing additional payment information). After steps 720, 730, 740, 750, 760 or 765, the routine continues to step 795 to determine whether to continue. If so, the routine continues to step 705, if not the routine continues to step 799 and ends.

As previously described with respect to other routines, the WSM Portal routine can be provided in various ways in various embodiments, including as part of an interactive Web site with which the user interacts and/or as part of a programmatically accessed API. In addition, various security mechanisms may be provided to ensure that users are authorized to obtain the information requested and/or to make the requested modifications to information.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for a computing system to provide paid access to remote Web services, the method comprising:

under control of an electronic marketplace provided by the computing system for selling and purchasing access to Web services, for each of multiple third-party Web service providers, in response to a registration request from the provider, registering a Web service from the provider that is available via the electronic marketplace, the registration request including an indication of how to invoke the Web service and of one or more use prices for access to the Web service by third-party Web service consumers;

receiving a first group of multiple requests from multiple third-party Web service consumers for information about the registered Web services;

in response to each of the multiple requests of the first group, providing information about a subset of the registered Web services to the consumer that made the request, the provided information including a determined access price for each of the registered Web services of the subset, the access prices being automatically determined by the electronic marketplace for each of at least one of the multiple requests of the first group by automatically determining the access price for each of one or more of the registered Web services of the subset for the request based at least in part on current conditions specific to that registered Web service;

in response to each of multiple later requests of a second group that are received after the providing of the information for the multiple requests of the first group and that are each received from one of the multiple third-party Web service consumers to subscribe to an indicated one of the registered Web services for which information was previously provided to that consumer, creating a subscription to the indicated Web service for later use by the consumer if the consumer provides an indication of payment for the access price of the indicated Web service that was included in the information previously provided to the consumer, the multiple requests of the second group including multiple subscription requests from a first of the consumers for multiple of the registered Web services, the provided indication of payment by the first consumer for the subscriptions to the multiple registered Web services being an indication to make the payment later after a specified period of time ends and based on a determined cumulative payment amount that the first consumer owes over the specified period of time, the determined cumulative payment amount being based at least in part of the access prices for the multiple registered Web services that were included in the information previously provided to the first consumer; and for each of a third group of multiple requests received from at least some of the third-party Web service consumers to access indicated registered Web services, satisfying the request if it is determined that the consumer from whom the request is received has a valid subscription for the Web service indicated in the request, by:

interacting with the provider that registered the Web service to invoke the Web service and receive response information, the invoking using the information from the provider that indicates how to invoke the Web service; and providing to the consumer the received response information.

2. The method of claim 1 wherein the multiple requests of the third group include an access request from the first consumer to access one of the multiple Web services indicated by the first consumer in the multiple subscription requests, wherein the access request from the first consumer is satisfied by the electronic marketplace automatically interacting with the provider that registered the one Web service so as to invoke the one Web service on behalf of the first consumer and receive response information that is provided to the first consumer, and wherein the method further comprises, after the satisfying of the access request from the first consumer and after the specified period of time ends, obtaining payment from the first consumer for the determined cumulative payment amount.

3. The method of claim 1 wherein, for one of the at least one requests of the first group that is received from one of the Web service consumers, the subset of registered Web services for which information is provided to the one consumer for the one request includes multiple Web services, wherein the automatically determined access price for each of the one or more registered Web services of the subset for the one request is further determined in a manner specific to the one consumer, wherein the automatic determining by the electronic marketplace of the access prices for the multiple Web services of the one request further includes determining the access price for at least one other of the multiple Web services of the subset in a manner that is not based on the current conditions and so as to be one of the use prices indicated by the Web service provider that registered that Web service, the at least one other Web service of the subset for the one request being distinct from the one or more Web services of the subset for the one request, wherein the multiple later requests of the second group include a subscription request from the one consumer to subscribe to one of the one or more registered Web services of the subset for the one request, wherein the multiple requests of the third group include an access request from the one consumer to access the one Web service to which the one consumer subscribed, and wherein the access request from the one consumer is satisfied by the electronic marketplace automatically interacting with the provider that registered the one Web service so as to invoke the one Web service on behalf of the one consumer and receive response information that is provided to the one consumer.

4. A computer-implemented method for providing paid access to remote Web services, the method comprising:

under control of one or more computing systems, in response to registration requests from providers of Web services, registering Web services available from the Web service providers so as to make access to the registered Web services available for purchase by consumers of Web services;

for each of one or more of the registered Web services, automatically determining an access price for access of a first Web service consumer to the Web service, the automatically determined access price for each of at least one of the one or more Web services being based at least in part on current conditions;

providing information about the one or more Web services to the first consumer; and responding to one or more requests received from the first consumer for an indicated one of the one or more Web services, the responding including automatically creating a subscription for the first consumer for later use of the indicated Web service and including obtaining payment from the first consumer for requested access of the first consumer to the indicated Web service and including providing access to the indicated Web service for the first consumer, the obtained payment being based on the automatically determined access price for the indicated Web service.

5. The method of claim 4 wherein the indicated Web service is one of the at least one Web services for which the determined access prices are based at least in part on current conditions, and wherein the current conditions on which the determined access price for the indicated Web service is based include an indicated Quality of Service level associated with the indicated Web service.

6. The method of claim 5 wherein the automatic determining of the access price for the indicated Web service is performed in response to at least one of the one or more requests received from the first consumer, and wherein the at least one requests specify the indicated Quality of Service level for the indicated Web service, the indicated Quality of Service level being one of multiple distinct Quality of Service levels available for the indicated Web service.

7. The method of claim 5 wherein the indicated Web service has multiple distinct possible Quality of Service levels that include the indicated Quality of Service level, wherein the automatic determining of the access price for the indicated Web service includes determining multiple distinct possible access prices for the indicated Web service that each correspond to one of the multiple distinct Quality of Service levels, and wherein the providing of the information about the one or more Web services to the first consumer includes providing information about the determined multiple possible access prices for the indicated Web service.

8. The method of claim 5 wherein the automatic determining of the access price for the indicated Web service is performed before the access of the first consumer to the indicated Web service occurs and includes automatically determining that the indicated Quality of Service level is currently available to the first consumer for the indicated Web service based at least in part on current conditions at a time of the automatic determining.

9. The method of claim 5 wherein the automatic determining of the access price for the indicated Web service is performed after the access of the first consumer to the indicated Web service occurs and includes automatically determining that the indicated Quality of Service level was actually provided for the access to the indicated Web service by the first consumer.

10. The method of claim 5 wherein the automatic determining of the access price for the indicated Web service is performed before the access of the first consumer to the indicated Web service occurs, and wherein the method further comprises, after the access of the first consumer to the indicated Web service occurs, automatically determining whether the indicated Quality of Service level was actually provided for the access of the first consumer to the indicated Web service, and taking one or more compensatory actions for the first consumer if it is determined that the indicated Quality of Service level was not actually provided for the access of the first consumer to the indicated Web service.

11. The method of claim 5 wherein the indicated Quality of Service level for the indicated Web service is based on at least one of a maximum response time by the indicated Web service to a request from the first consumer and of a minimum level of accuracy of response information provided to the first consumer by the one or more computing systems on behalf of the indicated Web service.

12. The method of claim 4 wherein the indicated Web service is one of the at least one Web services for which the determined access prices are based at least in part on current conditions, and wherein the current conditions on which the determined access price for the indicated Web service is based include an indicated Service Level Agreement associated with the indicated Web service and with the first consumer.

13. The method of claim 4 wherein the indicated Web service is one of the at least one Web services for which the determined access prices are based at least in part on current conditions, and wherein the current conditions on which the determined access price for the indicated Web service is based include a current usage rate of the indicated Web service.

14. The method of claim 13 wherein the one or more computing systems assist in providing an electronic marketplace, wherein the electronic marketplace makes marketplace points available to consumers that are for later use in purchasing access to at least some of the registered Web services, and wherein the automatic determining of the access price for the indicated Web service includes determining a quantity of the marketplace points for access of the first consumer to the indicated Web service.

15. The method of claim 4 wherein the indicated Web service is one of the at least one Web services for which the determined access prices are based at least in part on current conditions, and wherein the current conditions on which the determined access price for the indicated Web service is based include a current time.

16. The method of claim 15 wherein the one or more computing systems assist in providing an electronic marketplace, wherein the electronic marketplace makes marketplace points available to consumers that are for later use in purchasing access to at least some of the registered Web services, and wherein the automatic determining of the access price for the indicated Web service includes determining a quantity of the marketplace points for access of the first consumer to the indicated Web service.

17. The method of claim 4 wherein the one or more computing systems assist in providing an electronic marketplace, wherein the electronic marketplace makes marketplace points available to consumers that are not specific to particular registered Web services and that are for later use in purchasing access to at least some of the registered Web services, and wherein the automatic determining of the access price for the indicated Web service includes determining a quantity of the marketplace points for access of the first consumer to the indicated Web service, the quantity of the marketplace points being determined in a manner specific to the indicated Web service.

18. The method of claim 4 wherein the automatic determining of the access price for the indicated Web service is performed at a first time and results in a determined first access price for the indicated Web service based on the current conditions at the first time, and wherein the method further comprises:
  at a second time that is distinct from the first time, automatically determining a second access price for a second access to the indicated Web service by the first consumer, the determined second access price being distinct from the determined first access price based on current conditions at the second time that are distinct from the current conditions at the first time; and
  after obtaining a second payment from the first consumer for the second access of the first consumer to the indicated Web service, the obtained second payment being based on the automatically determined second access price for the indicated Web service, automatically facilitating the second access of the first consumer to the indicated Web service.

19. The method of claim 4 wherein the automatic determining of the access price for the indicated Web service is performed at a first time and results in a determined first access price for the indicated Web service based in part on the current conditions at the first time, wherein the first access price for the access of the first consumer to the indicated Web service is further determined in a manner specific to the first consumer, and wherein the method further comprises:
  automatically determining at the first time a second access price for access of a second consumer to the indicated Web service, the determined second access price being determined in a manner specific to the second consumer and being distinct from the determined first access price based at least in part on the second consumer; and
  after obtaining payment from the second consumer for the access of the second consumer to the indicated Web service, the obtained payment from the second consumer being based on the automatically determined second access price for the indicated Web service, automatically facilitating the access of the second consumer to the indicated Web service.

20. The method of claim 4 wherein the one or more registered Web services for which an access price is automatically determined include a plurality of registered Web services, wherein the one or more requests received from the first consumer include multiple access requests for access to multiple of the plurality of registered Web services, and wherein the obtaining of the payment from the first consumer for the access of the first consumer to the indicated Web service includes, at a later time after one or more predefined criteria are satisfied, obtaining payment from the first consumer for an accumulated fee amount that is based on a combination of the multiple determined access prices for the multiple Web services indicated in the multiple access requests.

21. The method of claim 20 wherein the one or more predefined criteria include an end of a specified period of time being reached.

22. The method of claim 4 wherein the providing to the first consumer of the information about the one or more Web services includes providing the determined access prices for the one or more Web services to the first consumer.

23. The method of claim 22 wherein the automatic determining of the access prices for the one or more Web services and the providing of the information about the one or more Web services are both performed in response to a request from the first consumer for the provided information.

24. The method of claim 4 wherein the automatic determining of the access prices for the one or more Web services is performed after the providing of the information about the one or more Web services and in response to at least one of the one or more requests received from the first consumer.

25. The method of claim 4 wherein the registering of the indicated Web service includes receiving one or more indicated use prices for the indicated Web service from the provider that registered the indicated Web service, wherein the automatic determining of the access price for the indicated Web service is further based at least in part on at least one of the indicated use prices, wherein the providing of the access to the indicated Web service for the first consumer includes invoking the indicated Web service from the provider of the indicated Web service on behalf of the first consumer and includes providing response information from the invoking to the first consumer, and wherein the method further comprises providing payment to the provider of the indicated Web service based in part on the obtained payment from the first consumer for the access of the first consumer to the indicated Web service.

26. The method of claim 4 wherein the method is performed by an organization unrelated to the consumers and the providers other than as customers and suppliers for the organization, and wherein the method further comprises registering one or more Web services provided by the organization and providing access to consumers to those Web services.

27. The method of claim 4 wherein the subscription provides the first consumer with access to the indicated Web service for a specified number of uses, and wherein the providing of the access to the indicated Web service for the first consumer is one of the specified number of uses.

28. The method of claim 27 wherein the access fee is associated with at least one of the providing of the access for the one use and of the creating of the subscription.

29. The method of claim 27 wherein the specified number of uses for the subscription is an indicated quantity of one or more uses.

30. The method of claim 4 wherein the subscription provides the first consumer with access to the indicated Web service for a specified amount of time, and wherein the providing of the access to the indicated Web service occurs during the specified amount of time.

31. The method of claim 30 wherein the access fee is associated with at least one of the providing of the access to the indicated Web service and of the creating of the subscription.

32. A computer-readable medium whose contents cause a computing system to provide paid access to remote services, by performing a method comprising:

providing information to consumers about multiple remote invocable services that are available from third-party providers for paid access by the consumers; and after one or more requests from a first consumer for one or more indicated invocable services of the multiple available invocable services, responding to the one or more requests by creating one or more subscriptions for later use to the first consumer for the indicated one or more invocable services and by providing to the first consumer access to the indicated one or more invocable services for one or more access fees associated with the indicated one or more invocable services, the responding to the one or more requests including, automatically determining at least one of the one or more access fees based at least in part on current conditions specific to at least one of the one or more indicated invocable services; and automatically invoking on behalf of the first consumer each of at least one of the indicated one or more invocable services from the provider of that invocable service.

33. The computer-readable medium of claim 32 wherein the current conditions specific to the at least one indicated invocable services include at least one of a Quality of Service level currently associated with providing one or more of the at least one indicated invocable services, of an indicated Service Level Agreement currently associated with the first consumer and with one or more of the at least one indicated invocable services, of a current usage rate of one or more of the at least one indicated invocable services, and of a current time.

34. The computer-readable medium of claim 33 wherein the multiple remote invocable services are Web services, and wherein the providing to the first consumer of the access to the indicated one or more invocable services includes obtaining payment from the first consumer for the one or more access fees associated with the indicated one or more invocable services.

35. The computer-readable medium of claim 32 wherein the one or more invocable services indicated by the one or more requests from the first consumer include a plurality of remote invocable services, and wherein the providing to the first consumer of the access to the indicated plurality of invocable services includes, at a later time after an end of a predefined period of time, obtaining payment from the first consumer for a fee amount accumulated during the period of time that includes fees for a plurality of determined access prices for the plurality of invocable services.

36. The computer-readable medium of claim 32 wherein the computer-readable medium is at least one of a memory of a computing system and of a data transmission medium that stores a generated data signal containing the contents, and wherein the contents are instructions that when executed cause the computing system to perform the method.

37. A computing device configured to provide paid access to Web services, comprising:

one or more storage devices configured to store information about Web services made available by third-party providers for paid access by third-party consumers of Web services, the stored information including at least one associated use price for each of the registered Web services; and one or more memories configured with executable instructions to provide to multiple consumers paid access to registered Web services, by:

receiving a plurality of requests that are each from one of the multiple consumers for paid access to an indicated one of the registered Web services, the plurality of requests including multiple requests from a first of the multiple consumers;

for each of the multiple consumers, creating for the consumer a subscription for later use to the one registered Web service indicated by the consumer and providing paid access of the consumer to that indicated one registered Web service in exchange for payment of an access fee based on a use price associated with that indicated one registered Web service; and at a later time after one or more predefined criteria are satisfied, obtaining the payment for the multiple access fees for the multiple access requests from the first consumer by accumulating the multiple access fees into a single cumulative fee amount, providing an indication to the first consumer of the single cumulative fee amount, and receiving payment from the first consumer for the single cumulative fee amount.

38. The computing device of claim 37 wherein the one or more predefined criteria include an end of a specified period of time being reached, wherein the plurality of requests further includes a second group of multiple access requests from a second of the consumers and a third group of multiple access requests from a third of the consumers, and wherein the providing to the consumers of the paid access to the registered Web services by the one or more memories configured with the executable instructions further includes:

before providing to the second consumer the paid access for the multiple access requests of the second group, obtaining payment from the second consumer for the access fees for the multiple access requests of the second group; and providing to the third consumer the paid access for the multiple access requests of the third group, the providing of the paid access to the third consumer occurring before obtaining payment from the third consumer for the access fees for the multiple access requests of the third group.

39. The computing device of claim 37 wherein the executable instructions are part of a Web Services Marketplace system for execution in at least one of the one or more memories of the computing device.

40. The computing device of claim 37 wherein the executable instructions are part of one or more means for providing to consumers paid access to registered Web services, by:

receiving a plurality of access requests that are each from one of the consumers for paid access to an indicated one of the registered Web services, the plurality of access requests including multiple access requests from a first of the consumers;

for each of the plurality of access requests, providing to the consumer that made the access request the paid access to the indicated Web service for the access request in exchange for payment of an access fee based on a use price associated with that indicated Web service; and at a later time after one or more predefined criteria are satisfied, obtaining the payment for the multiple access fees for the multiple access requests from the first consumer by accumulating the multiple access fees into a single cumulative fee amount, providing an indication to the first consumer of the single cumulative fee amount, and receiving payment from the first consumer for the single cumulative fee amount.

41. The computer-readable medium of claim 32 wherein the one or more subscriptions include a first subscription that provides the first consumer with access to the indicated one or more invocable services for a specified number of uses, and wherein the providing of the access to the indicated one or more invocable services is one of the specified number of uses.

42. The computer-readable medium of claim 41 wherein the one or more access fees are associated with at least one of the providing of the access for the one use and of the creating of the first subscription.

43. The computer-readable medium of claim 41 wherein the specified number of uses for the first subscription is an indicated quantity of one or more uses.

44. The computer-readable medium of claim 32 wherein the one or more subscriptions include a first subscription that provides the first consumer with access to the indicated one or more invocable services for a specified amount of time, and wherein the providing of the access to the indicated one or more invocable services occurs during the specified amount of time.

45. The computer-readable medium of claim 44 wherein the one or more access fees are associated with at least one of the providing of the access to the indicated one or more invocable services and of the creating of the first subscription.

46. The computing device of claim 37 wherein, for one of the multiple consumers, the subscription provides the one consumer with access to the indicated one registered Web service for a specified number of uses, and the providing of the paid access of the one consumer to that indicated one registered Web service is one of the specified number of uses.

47. The computing device of claim 46 wherein the payment of the access fee for the one consumer is associated with at least one of the providing of the paid access of the one consumer for the one use and of the creating of the subscription for the one consumer.

48. The computing device of claim 46 wherein the specified number of uses for the subscription for the one consumer is an indicated quantity of multiple uses.

49. The computing device of claim 37 wherein, for one of the multiple consumers, the subscription provides the one consumer with access to the indicated one registered Web service for a specified amount of time, and wherein the providing of the paid access of the one consumer to the indicated one registered Web service occurs during the specified amount of time.

50. The computing device of claim 49 wherein the payment of the access fee for the one consumer is associated with at least one of the providing of the paid access of the one consumer for the one use and of the creating of the subscription for the one consumer.

* * * * *